(12) United States Patent
Pandit et al.

(10) Patent No.: US 10,244,231 B2
(45) Date of Patent: *Mar. 26, 2019

(54) METHOD AND APPARATUS FOR DECOUPLING FRAME NUMBER AND/OR PICTURE ORDER COUNT (POC) FOR MULTI-VIEW VIDEO ENCODING AND DECODING

(71) Applicant: INTERDIGITAL VC HOLDINGS, INC., Wilmington, DE (US)

(72) Inventors: Purvin Bibhas Pandit, Franklin Park, NJ (US); Yeping Su, Cupertino, CA (US); Peng Yin, Ithaca, NY (US); Cristina Gomila Torres, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,184

(22) Filed: Mar. 20, 2017

(65) Prior Publication Data

US 2017/0264893 A1 Sep. 14, 2017

Related U.S. Application Data

(63) Continuation of application No. 12/309,063, filed as application No. PCT/US2007/015678 on Jul. 5, 2007, now Pat. No. 9,641,842.

(Continued)

(51) Int. Cl.
*H04N 19/103* (2014.01)
*H04N 19/176* (2014.01)
(Continued)

(52) U.S. Cl.
CPC ......... *H04N 19/103* (2014.11); *H04N 19/176* (2014.11); *H04N 19/46* (2014.11);
(Continued)

(58) Field of Classification Search
None
See application file for complete search history.

(56) References Cited

U.S. PATENT DOCUMENTS 5,736,943 A 4/1998 Herre et al.
7,164,633 B2 1/2007 Iida et al.
(Continued)

FOREIGN PATENT DOCUMENTS

EP 1389020 2/2004
JP 2004048579 2/2004
(Continued)

OTHER PUBLICATIONS

Provisional app. No. 60757289, "Multi-view video coding system", Jan. 2006.*

(Continued)

*Primary Examiner* — Faruk Hamza
*Assistant Examiner* — Thinh D Tran
(74) *Attorney, Agent, or Firm* — Brian J. Dorini; Ronald J. Kolczynski

(57) ABSTRACT

There is disclosed and described a decoder and decoding method for decoding at least one picture corresponding to at least one of at least two views of multi-view video content from a bitstream, wherein in the bitstream at least one of coding order information and output order information for the at least one picture is decoupled from the at least one view to which the at least one picture corresponds. Furthermore, there is disclosed and described an encoder and encoding method for encoding at least one picture corresponding to at least one of at least two views of multi-view (Continued)

US 10,244,231 B2

Page 2 video content to form a resultant bitstream, wherein in the resultant bitstream at least one of coding order information and output order information for the at least one picture is decoupled from the at least one view to which the at least one picture corresponds.

5 Claims, 22 Drawing Sheets

Related U.S. Application Data

(60) Provisional application No. 60/818,874, filed on Jul. 6, 2006.

(51) Int. Cl.
*H04N 19/46* (2014.01)
*H04N 19/513* (2014.01)
*H04N 19/597* (2014.01)
*H04N 19/61* (2014.01)
*H04N 19/70* (2014.01)

(52) U.S. Cl.
CPC ......... *H04N 19/513* (2014.11); *H04N 19/597* (2014.11); *H04N 19/61* (2014.11); *H04N 19/70* (2014.11)

(56) References Cited

U.S. PATENT DOCUMENTS

| 8,275,048 | B2 | 9/2012 | Kitahara et al. |
| 8,842,729 | B2 * | 9/2014 | Su .................. H04N 19/597 375/240.12 |
| 2002/0012315 | A1 | 1/2002 | Iida et al. |
| 2003/0202592 | A1 | 10/2003 | Sohn et al. |
| 2005/0129127 | A1 | 6/2005 | Jeon |
| 2005/0163346 | A1 | 7/2005 | van den Bergen et al. |
| 2007/0121722 | A1 | 5/2007 | Martinian et al. |
| 2007/0247549 | A1 | 10/2007 | Jeong et al. |
| 2007/0286281 | A1 | 12/2007 | Tsuchiya et al. |
| 2008/0317125 | A1 | 12/2008 | Murakami et al. |
| 2009/0103619 | A1 | 4/2009 | Sohn et al. |
| 2009/0107945 | A1 | 4/2009 | Ehrenleitner |
| 2009/0238269 | A1 | 9/2009 | Pandit et al. |

FOREIGN PATENT DOCUMENTS

| JP | 2004228617 | 8/2004 | |
| JP | 2005244503 | 9/2005 | |
| JP | 2005303773 | 10/2005 | |
| JP | 2008503973 | 2/2008 | |
| JP | 2009502690 | 1/2009 | |
| JP | 2009532932 | 9/2009 | |
| RU | 2124272 | 12/1998 | |
| RU | 2201654 | 3/2003 | |
| RU | 2204217 | 5/2003 | |
| RU | 2001105183 | 6/2003 | |
| RU | 2237283 | 9/2004 | |
| WO | WO2005004492 | 1/2005 | |
| WO | WO2006001653 | 1/2006 | |
| WO | WO-2006001653 A1 * | 1/2006 | ........... H04N 19/597 |
| WO | WO2006016418 | 2/2006 | |
| WO | WO2006038568 | 4/2006 | |
| WO | WO2007114610 | 10/2007 | |

OTHER PUBLICATIONS

Iain E Richardson, "H.264/AVC Picture Management", John Wiley & Sons, 2004 (Year: 2004).*
Provosional app. 60787171, "Multi-view coding method" Mar. 2006.
U.S. Appl. No. 60/757,289, "Multi-View Video Coding System", Jan. 9, 2006.
ISO/IEC JTC1/SC29/WG11 N8018, "Technologies under Study for Reference Picture Management and High-Level Syntax for Multiview Video Coding," Montreux, Switzerland, Apr. 2006, XP-0030014510.
International Search Report, dated Oct. 20, 2008.
Martinian, et al., "Results of Core Experiment 1B on Multiview Coding", ISO/IEC JTC1/SC29/WG11, M13122, Montreux, Switzerland, Apr. 2006, XP-0030041791.
Mueller, et al., "Multiview Coding Using AVC", ISO/IEC JTC1/SC29/WG11, MPEG2006/m12945, Bangkok, Thailand, Fraunhofer HHI Jan. 2006, XP-0030041614.
Pandit, et al. "On MVC High-Level Syntax for Picture Management", ISO/IEC JTC1/SC29/WG11, MPEG2006/M13718, Klagenfurt, Austria, Jul. 2006, XP-0030042387.
Vetro et al., "Joint Draft 3.0 on Multiview Video Coding", JVT-W209 of ISO/IEC MPEG & ITU-T VCEG, 23rd Meeting, San Jose, CA, USA, Apr. 21-27, 2007, XP-0030007110.
Sullivan et al., N6540, "Text of ISO/IEC 14496 10 Advanced Video Coding 3rd Edition", ISO/IEC JTC 1/SC29/WG11, Redmond, WA, USA, Jul. 2004.
ISO/IEC JTC1/SC29/WG11, N8019, "Description of core Experiments in MVC", Montreaux, Switzerland, Apr. 2006.
ISO/IEC JTC1/SC29/WG11, N7539, "Requirements on Multi-View Video Coding V.5", Nice France, Oct. 2005.
ITU-T Recommendation H.264, "Advanced Video Coding for Generic Audiovisual Services", Series H: Audiovisual and Multimedia Systems, Infrastructure of Audiovisual Services—Coding of moving video, Mar. 2005.
Martinian et al., "V-Picture Syntax for Random Access in Multi-View Video Compression", ISO/IEC JTC1/SC29/WG11, M13121, Montreaux, Switzerland, Apr. 2006.
Sohn et al., "H.264/AVC-Compatible Multi-View Video Coding", International Organisation for Standardisation, ISO/IEC JTC1/SC29WG 11, Coding of Moving Pictures and Audio, Bangkok, Thailand, Jan. 2006.
ISO 2382-1:1993, Translated by L.V. Shutkin, Nov. 25, 2005, the All-Russian Scientific Research Institute for Problems of Computer Technology and Information.
L.M. Nevdjaev, "Telecommunications Technologies, English-Russian Explanatory Dictionary", Communication and Business, Moscow, 2002, p. 490.
Advanced Video Coding Standard, ISO/IEC 14496, Oct. 2005.
Martinian et al., "View Synthesis for Multiview Video Compression", Mitsubishi Electric Research Laboratories, TR2006-035, Cambridge, Massachusetts, Apr. 2006.
Sullivan et al., JVT-M050d4, Draft of Version 4 of H.264/AVC (ITU-T Recommendation H.264 and ISO/IEC 14496-10 (MPEG-4 part 10) Advanced Video Coding), Palma de Mallorca, ES, Oct. 18-22, 2004.
Richardson, Iain; "H.264/AVC Picture Management," John Wiley & Sons, 2004.
Kim et al., "Comments on High-Level Syntax for MVC Contribution to the 76th MPEG meeting," ISO/IEC JTC1/SC29/WG1 MPEG2006/m13319, Montreux, Apr. 2006, XP0030041988.

* cited by examiner

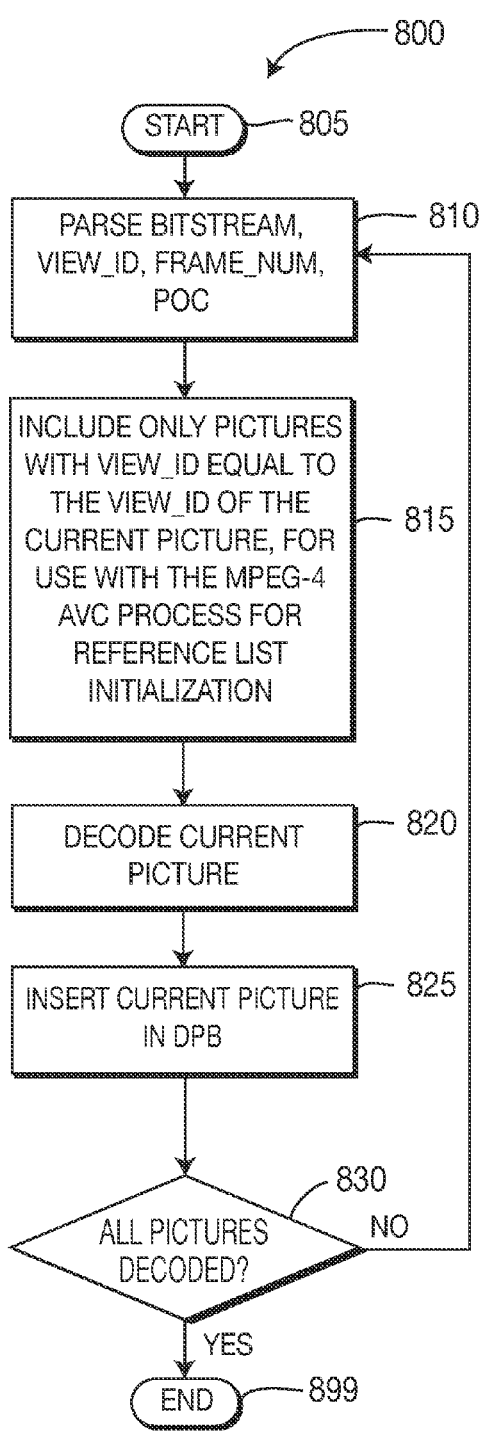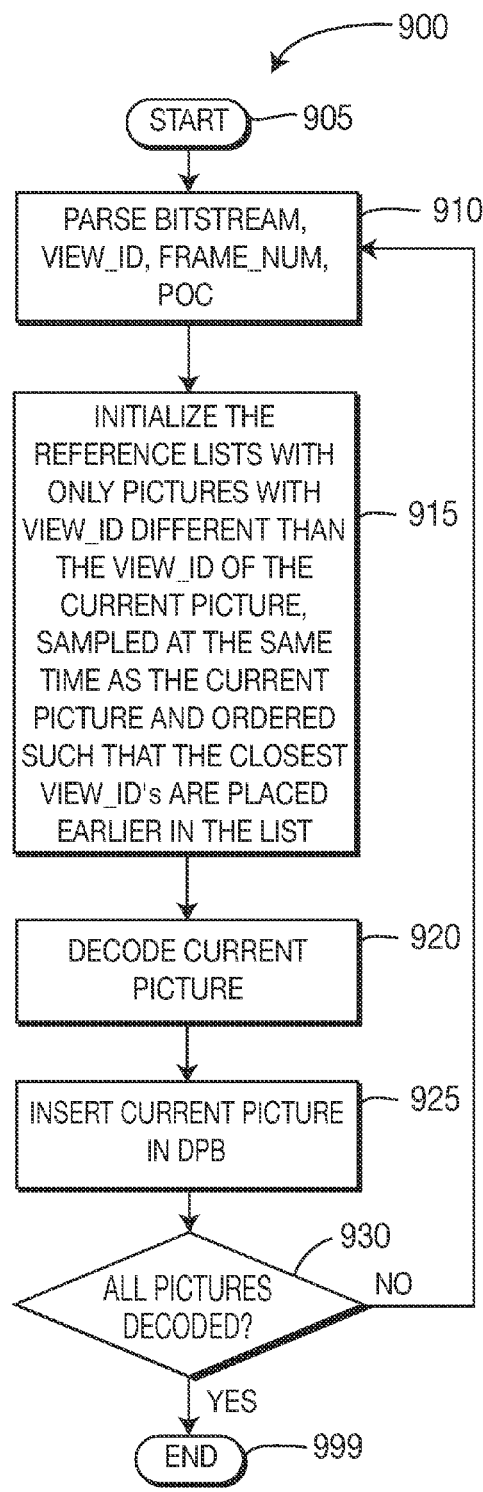
FIG. 8                    FIG. 9

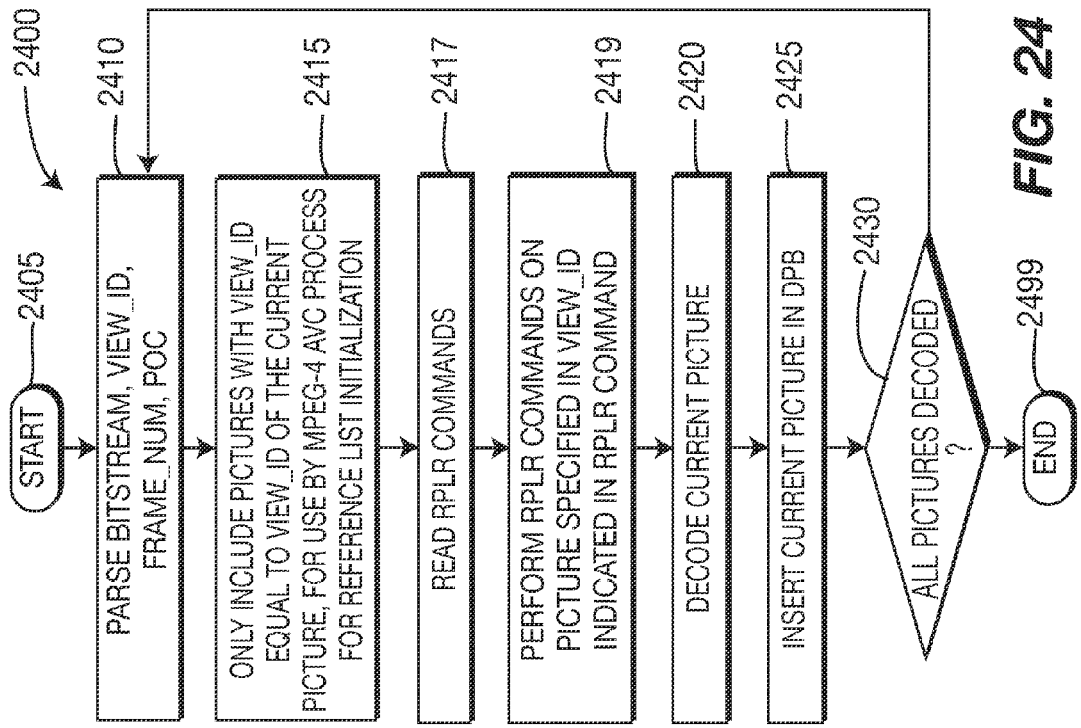
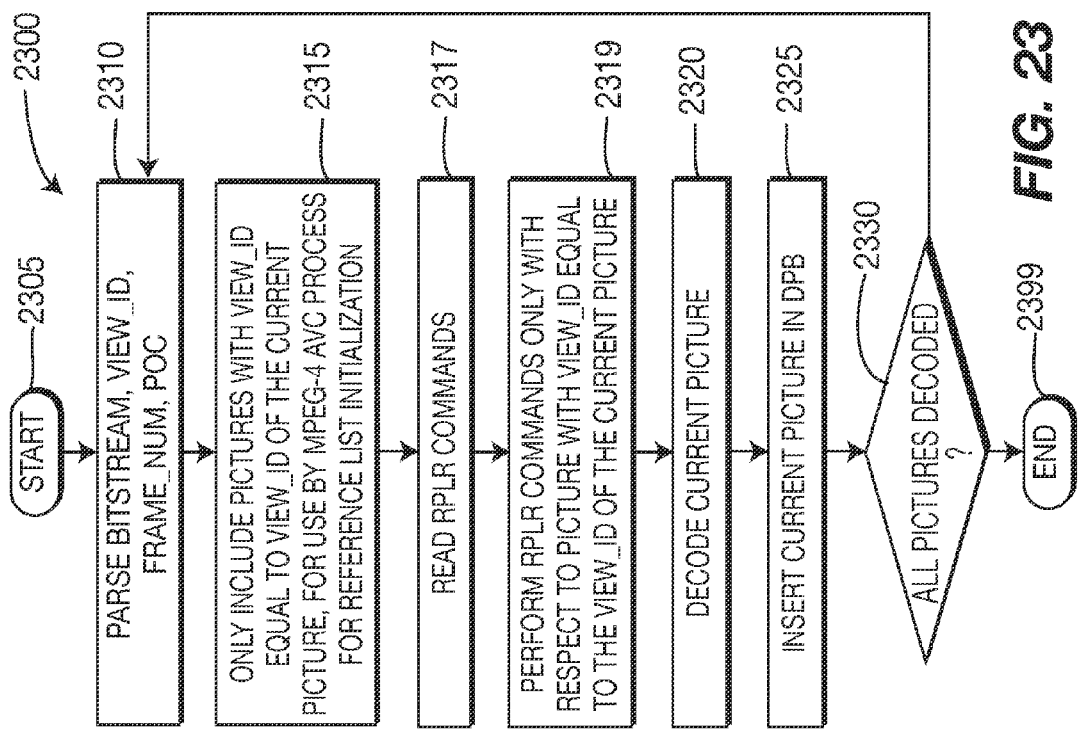

METHOD AND APPARATUS FOR DECOUPLING FRAME NUMBER AND/OR PICTURE ORDER COUNT (POC) FOR MULTI-VIEW VIDEO ENCODING AND DECODING

CROSS-REFERENCE TO RELATED APPLICATIONS

This application claims the benefit of U.S. Provisional Application Ser. No. 60/818,874, filed Jul. 6, 2006 and U.S. Provisional Application Ser. No. 60/807,706, filed Jul. 18, 2006 which are incorporated by reference herein in their respective entireties. Further, this application is related to the non-provisional application, application Ser. No. 12/309,062 entitled "Method and Apparatus for Decoupling Frame Number and/or Picture Order Count (POC) for Multi-view Video Encoding and Decoding", which is commonly assigned, incorporated by reference herein, and currently filed herewith.

TECHNICAL FIELD

The present principles relate generally to video encoding and decoding and, more particularly, to a method and apparatus for decoupling frame number and/or Picture Order Count (POC) for multi-view video encoding and decoding.

BACKGROUND

In the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"), the syntax element frame_num is used as an identifier for pictures and has several constraints as defined in the MPEG-4 AVC standard. The primary purpose of frame_num is to act as a counter that increments each time a picture is decoded so that if there are losses of data, the decoder can detect that some picture(s) were missing and would be able to conceal the problem. frame_num increases in decoding order of access units and does not necessarily indicate display order. The Memory Management Control Operations (MMCO) use the value of frame_num to mark pictures as long term and short term references; or mark reference pictures as unused for reference pictures. frame_num is also used for the default reference list ordering for P and SP slices.

The Picture Order Count in the MPEG-4 AVC standard is an indication of the timing or output ordering of a particular picture. Picture order count is a variable having a value that is non-decreasing with increasing picture position in output order relative to the previous Instantaneous Decoding Refresh (IDR) picture in decoding order or relative to the previous picture containing the memory management control operation that marks all reference pictures as "unused for reference". Picture Order Count is derived from slice header syntax elements. Picture Order Count is used in the derivation of motion vectors in temporal DIRECT mode, implicit weighted prediction, and default initial reference picture list ordering for B slices.

In particular, DIRECT mode motion parameters using temporal correlation are typically derived for the current macroblock/block by considering the motion information within a co-located position in a subsequent reference picture or more precisely the first List 1 reference. Turning to FIG. 1, a diagram illustrating temporal DIRECT prediction in B slice coding is indicated generally by the reference numeral 100. Following the presumption that an object is moving with constant speed these parameters are scaled according to the temporal distances (as shown in FIG. 1) of the reference pictures involved. The motion vectors $\overrightarrow{MV}_{L0}$ and $\overrightarrow{MV}_{L1}$ for a DIRECT coded block versus the motion vector $\overrightarrow{MV}$ of its co-located position in the first List 1 reference are calculated as follows:

$$X = (16384 + abs(TD_D/2))/TD_D \quad (1)$$

$$\text{ScaleFactor} = \text{clip}(-1024, 1023, (TD_B \times X + 32) >> 6) \quad (2)$$

$$\overrightarrow{MV}_{L0} = (\text{ScaleFactor} \times \overrightarrow{MV} + 128) >> 8 \quad (3)$$

$$\overrightarrow{MV}_{L1} = \overrightarrow{MV}_{L0} - \overrightarrow{MV} \quad (4)$$

In the preceding equations, $TD_B$ and $TD_D$ are the temporal distances, or more precisely Picture Order Count (POC) distances, of the reference picture used by the List 0 motion vector of the co-located block in the List 1 picture compared to the current and the List 1 picture, respectively. The List 1 reference picture and the reference in List 0 referred by the motion vectors of the co-located block in List 1 are used as the two references of DIRECT mode. If the reference index refIdxL0 refers to a long-term reference picture, or DiffPicOrderCnt(pic1, pic0) is equal to 0, the motion vectors $\overrightarrow{MV}_{L0}$ and $\overrightarrow{MV}_{L1}$ for the direct mode partition are derived by the following:

$\overrightarrow{MV}_{L0}$=mv of the collocated macroblock $\overrightarrow{MV}_{L1}$=0

The implicit weighted prediction tool also uses Picture Order Count information to determine the weights. In weighted prediction (WP) implicit mode, weighting factors are not explicitly transmitted in the slice header, but instead are derived based on relative distances between the current picture and the reference pictures. Implicit mode is used only for bi-predictively coded macroblocks and macroblock partitions in B slices, including those using DIRECT mode. For implicit mode the formula shown in Equation (1) is used, except that the offset values $O_0$ and $O_1$ are equal to zero, and the weighting factors $W_0$ and $W_1$ are derived using the formulas below in Equation (6) to Equation (10).

$$\text{predPartC}[x,y] = \text{Clip1}C(((\text{predPartL0}C[x,y]*w0 + \text{predPartL1}C[x,y]*w1 + 2 \log WD) >> (\log WD+1)) + ((o0+o1+1) >> 1)) \quad (5).$$

$$X = (16384 + (TD_D >> 1))/TD_D \quad (6)$$

$$Z = \text{clip3}(-1024, 1023, (TD_B \cdot X + 32) >> 6) \quad (7)$$

$$W_1 = Z >> 2 \quad (8)$$

$$W_0 = 64 - W_1 \quad (9)$$

This is a division-free, 16-bit safe operation implementation of the following:

$$W_1 = (64 \cdot TD_D)/TD_B \quad (10)$$

$$\text{DiffPicOrderCnt}(picA, picB) = \text{PicOrderCnt}(picA) - \text{PicOrderCnt}(picB) \quad (11)$$

where $TD_B$ is temporal difference between the List 1 reference picture and the List 0 reference picture, clipped to the range [−128, 127] and $TD_B$ is the difference of the current picture and the List 0 reference picture, clipped to the range [−128, 127]. In Multi-view Video Coding, there can be cases where $TD_D$ can evaluate to zero (this happens when DiffPicOrderCnt(pic1, pic2) in Equation (11) becomes zero). In such a case, the weights $W_0$ and $W_1$ are set to 32.

In the current MPEG-4 AVC compliant implementation of Multi-view Video Coding (MVC), the reference software achieves multi-view prediction by interleaving all video sequences into a single stream. In this way, frame_num and Picture Order Count between views are coupled together. This has several disadvantages. One disadvantage is there will be gaps in the value of frame_num for partial decoding. This may complicate the management of reference picture lists or make error loss detection based on frame_num gap impossible. Another disadvantage is Picture Order Count does not have a real physical meaning, which can break any coding tool which relies upon Picture Order Count information, such as temporal DIRECT mode or implicit weighted prediction. Yet another disadvantage is that the coupling makes parallel coding of multi-view sequences more difficult.

SUMMARY

These and other drawbacks and disadvantages of the prior art are addressed by the present principles, which are directed to a method and apparatus for decoupling frame number and Picture Order Count (POC) for multi-view video encoding and decoding.

According to an aspect of the present principles, there is provided an apparatus. The apparatus includes an encoder for encoding at least one picture corresponding to at least one of at least two views of multi-view video content to form a resultant bitstream. In the resultant bitstream at least one of coding order information and output order information for the at least one picture is decoupled from the at least one view to which the at least one picture corresponds.

According to another aspect of the present principles, there is provided a method. The method includes encoding at least one picture corresponding to at least one of at least two views of multi-view video content to form a resultant bitstream. In the resultant bitstream at least one of coding order information and output order information for the at least one picture is decoupled from the at least one view to which the at least one picture corresponds.

According to yet another aspect of the present principles, there is provided an apparatus. The apparatus includes an encoder for encoding at least one of at least two views corresponding to multi-view video content. The encoder encodes the at least one of the at least two views using redefined variables in a default reference picture list construction process and reference picture list reordering corresponding to the International Organization for Standardization/International Electrotechnical Commission Moving Picture Experts Group-4 Part 10 Advanced Video Coding standard/International Telecommunication Union, Telecommunication Sector H.264 recommendation.

According to still another aspect of the present principles, there is provided an apparatus. The apparatus includes an encoder for encoding at least one of at least two views corresponding to multi-view video content. The encoder encodes the at least one of the at least two views using redefined variables in a decoded reference picture marking process of the International Organization for Standardization/International Electrotechnical Commission Moving Picture Experts Group-4 Part 10 Advanced Video Coding standard/International Telecommunication Sector H.264 recommendation.

According to a further aspect of the present principles, there is provided a method. The method includes encoding at least one of at least two views corresponding to multi-view video content. The encoding step encodes the at least one of the at least two views using redefined variables in a default reference picture list construction process and reference picture list reordering corresponding to the International Organization for Standardization/International Electrotechnical Commission Moving Picture Experts Group-4 Part 10 Advanced Video Coding standard/International Telecommunication Union, Telecommunication Sector H.264 recommendation.

According to a yet further aspect of the present principles, there is provided a method. The method includes encoding at least one of at least two views corresponding to multi-view video content. The encoding step encodes the at least one of the at least two views using redefined variables in a decoded reference picture marking process of the International Organization for Standardization/International Electrotechnical Commission Moving Picture Experts Group-4 Part 10 Advanced Video Coding standard/International Telecommunication Union, Telecommunication Sector H.264 recommendation.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 8 is a flow diagram for an exemplary method for decoding multi-view video content using modified reference picture list construction, in accordance with an embodiment of the present principles;

FIG. 9 is a flow diagram for another exemplary method for decoding multi-view video content using modified reference picture list construction, in accordance with an embodiment of the present principles;

FIG. 23 is a flow diagram for an exemplary method for decoding multi-view video content using modified reference picture list construction with Reference Picture List Reordering (RPLR) commands, in accordance with an embodiment of the present principles; and FIG. 24 is a flow diagram for another exemplary method for decoding multi-view video content using modified reference picture list construction with Reference Picture List Reordering (RPLR) commands, in accordance with an embodiment of the present principles.

DETAILED DESCRIPTION

Figure 1:
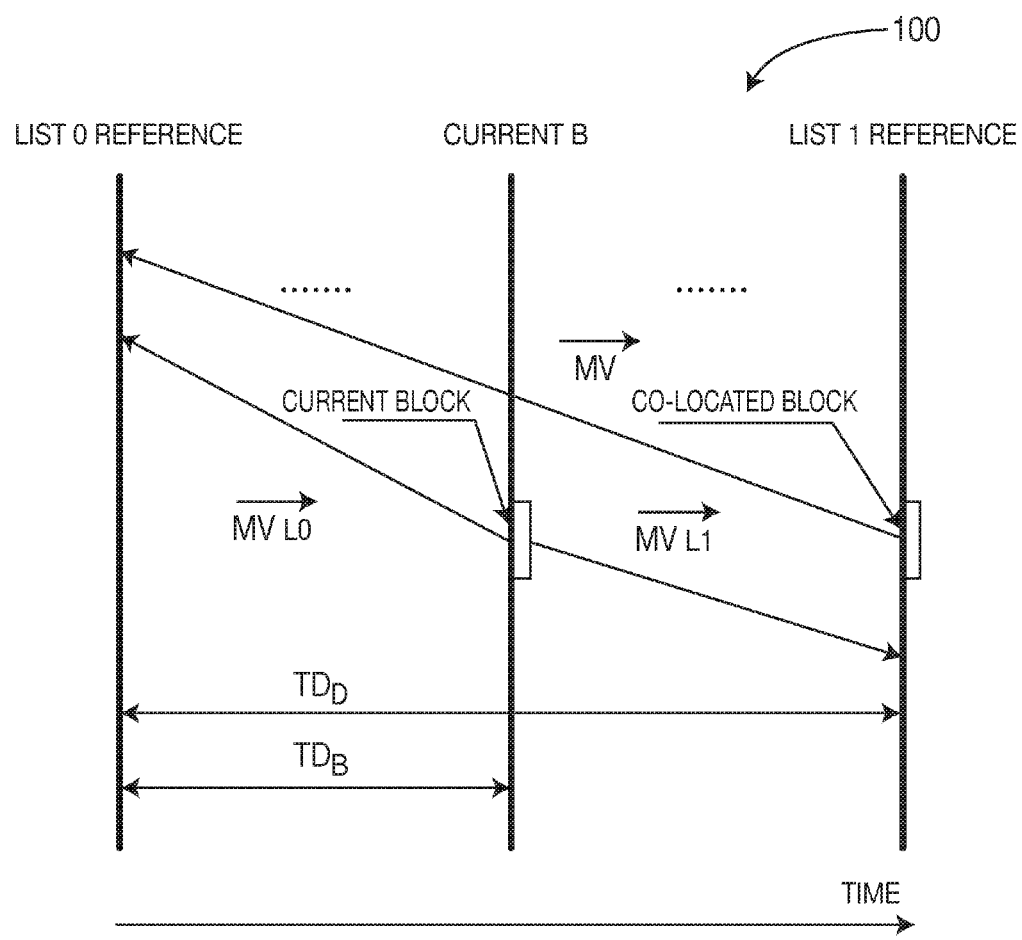
FIG. 1 is a diagram illustrating temporal DIRECT prediction in B slice coding.

The present principles are directed to a method and apparatus for decoupling frame number and Picture Order Count (POC) for multi-view video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, picture parameter set level, sequence parameter set level and NAL unit header level.

Further, as used herein, "previously unused syntax" refers to syntax that does not yet exist in any currently known video coding standards and recommendations and extensions thereof including, but not limited to, the MPEG-4 AVC standard.

Also, as used herein, "coding order information" refers to information present in a video bitstream that indicates the order in which the pictures in the bitstream are coded and/or decoded. Coding order information may include, for example, frame_num.

Additionally, as used herein, "output order information" refers to information present in a video bitstream that indicates the order in which the pictures in the bitstream are output. Output order information may include, for example, a Picture Order Count (POC) value.

Moreover, it is to be appreciated that while the present principles are described herein with respect to the MPEG-4 AVC standard, the present principles are not limited to solely this standard and, thus, may be utilized with respect to other video coding standards and extensions thereof, including extensions of the MPEG-4 AVC standard, while maintaining the spirit of the present principles.

Further, as interchangeably used herein, "cross-view" and "inter-view" both refer to pictures that belong to a view other than a current view.

Figure 2A:
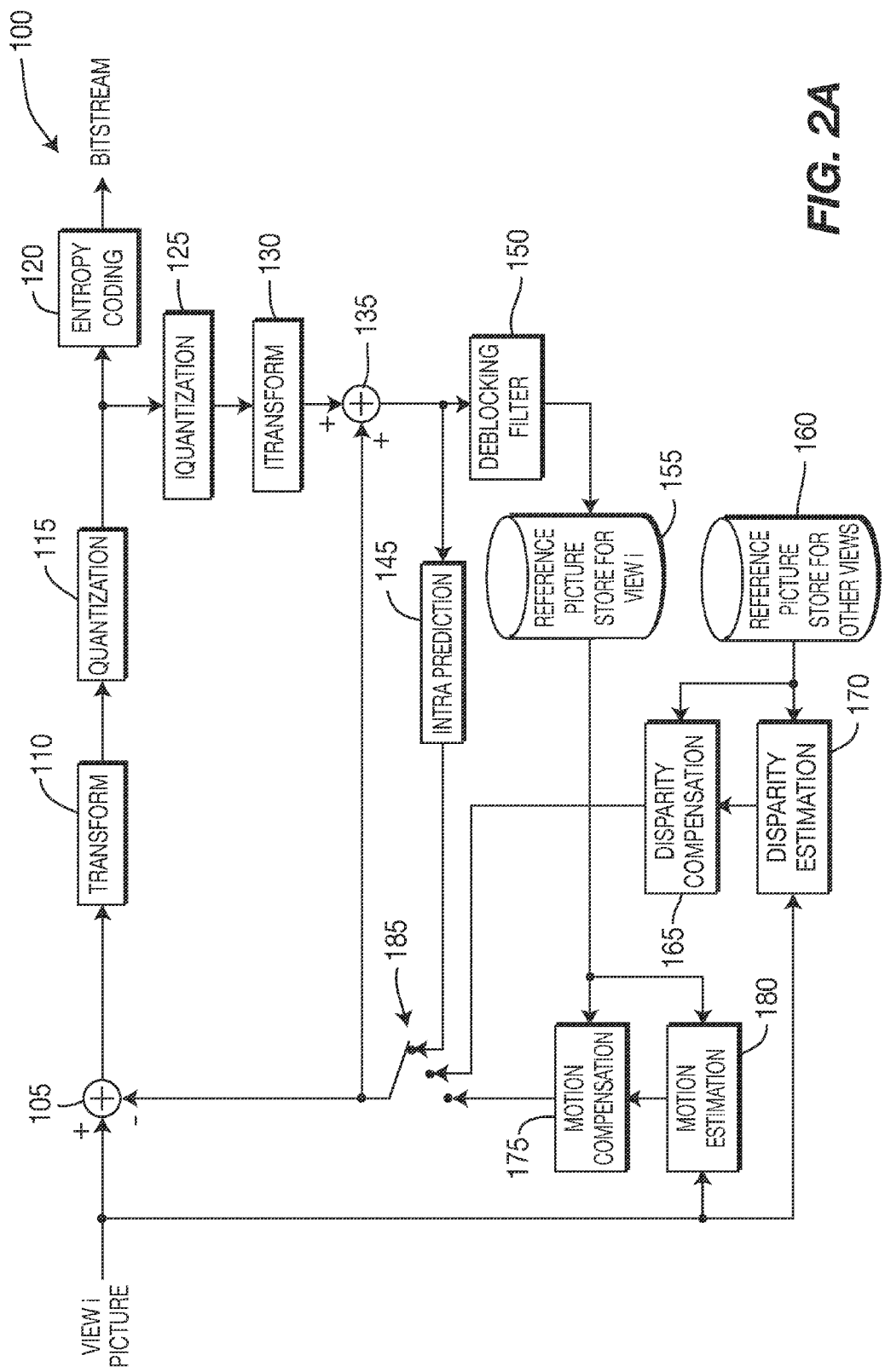
FIG. 2A is a block diagram for an exemplary Multi-view Video Coding (MVC) encoder to which the present principles may be applied, in accordance with an embodiment of the present principles.

Turning to FIG. 2A, an exemplary Multi-view Video Coding (MVC) encoder is indicated generally by the reference numeral 100. The encoder 100 includes a combiner 105 having an output connected in signal communication with an input of a transformer 110. An output of the transformer 110 is connected in signal communication with an input of quantizer 115. An output of the quantizer 115 is connected in signal communication with an input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of an intra predictor 145 and an input of a deblocking filter 150. An output of the deblocking filter 150 is connected in signal communication with an input of a reference picture store 155 (for view i). An output of the reference picture store 155 is connected in signal communication with a first input of a motion compensator 175 and a first input of a motion estimator 180. An output of the motion estimator 180 is connected in signal communication with a second input of the motion compensator 175.

An output of a reference picture store 160 (for other views) is connected in signal communication with a first input of a disparity estimator 170 and a first input of a disparity compensator 165. An output of the disparity estimator 170 is connected in signal communication with a second input of the disparity compensator 165.

An output of the entropy decoder 120 is available as an output of the encoder 100. A non-inverting input of the combiner 105 is available as an input of the encoder 100, and is connected in signal communication with a second input of the disparity estimator 170, and a second input of the motion estimator 180. An output of a switch 185 is connected in signal communication with a second non-inverting input of the combiner 135 and with an inverting input of the combiner 105. The switch 185 includes a first input connected in signal communication with an output of the motion compensator 175, a second input connected in signal communication with an output of the disparity compensator 165, and a third input connected in signal communication with an output of the intra predictor 145.

Figure 2B:
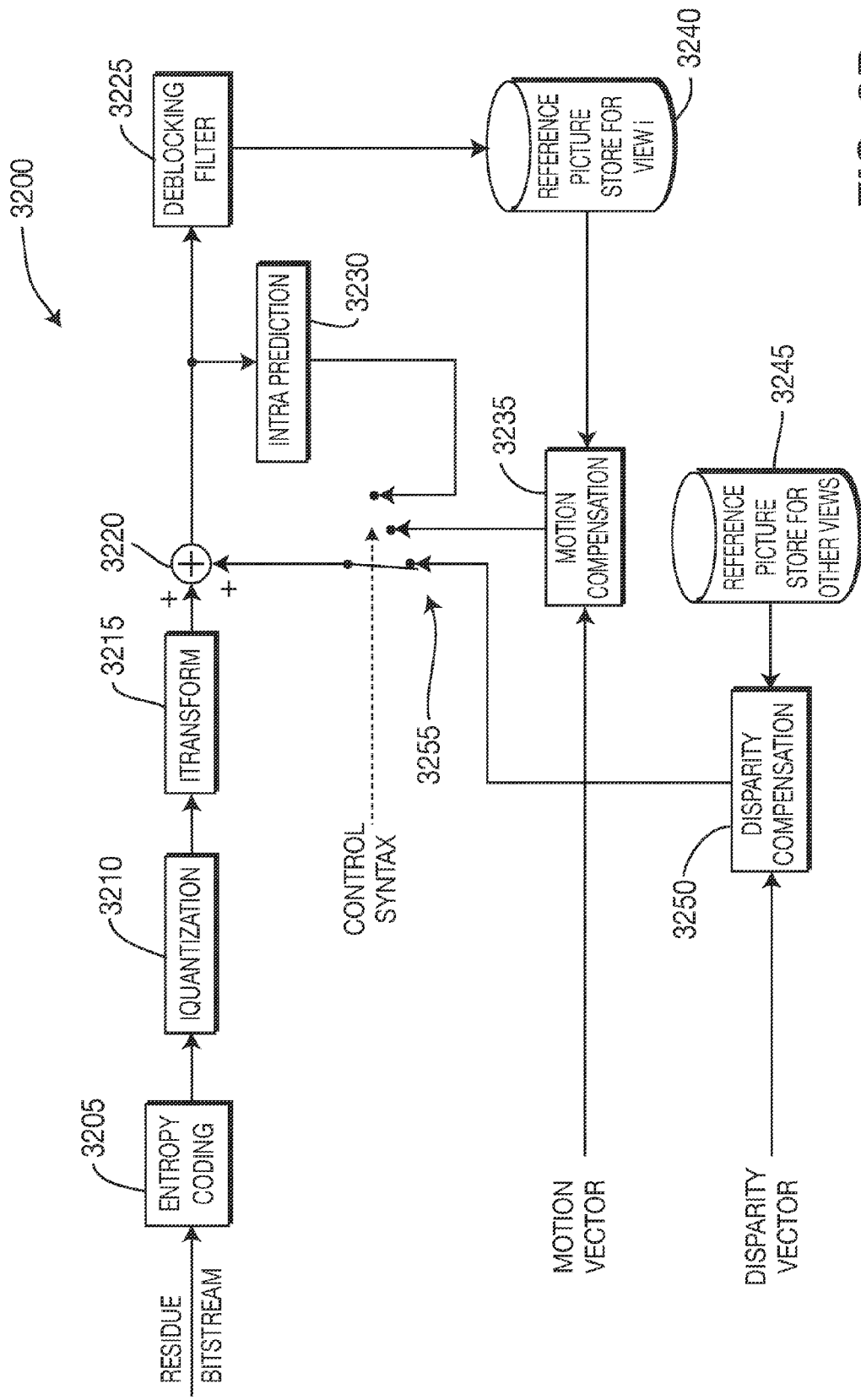
FIG. 2B is a block diagram for an exemplary Multi-view Video Coding (MVC) decoder to which the present principles may be applied, in accordance with an embodiment of the present principles.

Turning to FIG. 2B, an exemplary Multi-view Video Coding (MVC) decoder is indicated generally by the reference numeral 3200. The decoder 3200 includes an entropy decoder 3205 having an output connected in signal communication with an input of an inverse quantizer 3210. An output of the inverse quantizer is connected in signal communication with an input of an inverse transformer 3215. An output of the inverse transformer 3215 is connected in signal communication with a first non-inverting input of a combiner 3220. An output of the combiner 3220 is connected in signal communication with an input of a deblocking filter 3225 and an input of an intra predictor 3230. An output of the deblocking filter 3225 is connected in signal communication with an input of a reference picture store 3240 (for view i). An output of the reference picture store 3240 is connected in signal communication with a first input of a motion compensator 3235.

An output of a reference picture store 3245 (for other views) is connected in signal communication with a first input of a disparity compensator 3250.

An input of the entropy coder 3205 is available as an input to the decoder 3200, for receiving a residue bitstream. Moreover, a control input of the switch 3255 is also available as an input to the decoder 3200, for receiving control syntax to control which input is selected by the switch 3255. Further, a second input of the motion compensator 3235 is available as an input of the decoder 3200, for receiving motion vectors. Also, a second input of the disparity compensator 3250 is available as an input to the decoder 3200, for receiving disparity vectors.

An output of a switch 3255 is connected in signal communication with a second non-inverting input of the combiner 3220. A first input of the switch 3255 is connected in signal communication with an output of the disparity compensator 3250. A second input of the switch 3255 is connected in signal communication with an output of the motion compensator 3235. A third input of the switch 3255 is connected in signal communication with an output of the intra predictor 3230. An output of the mode module 3260 is connected in signal communication with the switch 3255 for controlling which input is selected by the switch 3255. An output of the deblocking filter 3225 is available as an output of the decoder.

In accordance with the present principles, several changes are proposed to the high level syntax of the MPEG-4 AVC standard for efficient coding of a multi-view video sequence. In an embodiment, it is proposed to decouple the frame number (frame_num) and/or Picture Order Count (POC) values between views when coding a multi-view video sequence. One possible application is we can apply MPEG-4 AVC compliant decoding and output process for each view independently. In an embodiment, the frame number and/or Picture Order Count values between views are decoupled by sending a view-id for each of the views. Previously, it has been simply proposed to add a view identifier (view_id) in high level syntax, since view_id information is needed for several Multi-view Video Coding (MVC) requirements including view interpolation/synthesis, view random access, parallel processing, and so forth. The view_id information can also be useful for special coding modes that only relate to cross-view prediction. It is this view_id that is used in accordance with the present principles to decouple the frame number and Picture Order Count values between the views of multi-view video content. Moreover, in an embodiment, a solution is proposed for fixing the coding tools in the MPEG-4 AVC standard with respect to multi-view Video Coding.

In an embodiment, each view will have a different view_id, thus allowing the same frame_num and POC to be reused for different views.

|    | T0 | T8 | T4 | T2 | T6 | T1 | T3 | T5 | T7 | (Time) |
|----|----|----|----|----|----|----|----|----|----|--------|
| S0 | I0 | I8 | B4 | B2 | B6 | B1 | B3 | B5 | B7 | (View 0 slice types) |
| S1 | B0 | B8 | B4 | B2 | B6 | B1 | B3 | B5 | B7 | (View 1 slice types) |
| S2 | P0 | P8 | B4 | B2 | B6 | B1 | B3 | B5 | B7 | (View 2 slice types) |
|    | 0  | 1  | 2  | 3  | 4  | 5  | 6  | 7  | 8  | (frame_num) |

There are several ways in which the different views can be coded to enable parallel processing. One possible way is to encode in such a way that the pictures in one view are coded first for a GOP followed by pictures from another view for the same GOP size until all the views have been encoded for that GOP. The process is then repeated for other GOPs. In the illustration above, first the pictures in view S0 are coded followed by pictures from view S2 and then S1.

Another possible way would be to code all the picture in all the views belonging to the same time instance to be coded first followed by another set of pictures belonging to another time instance in all the views. This process is repeated till all the pictures have been coded. In the illustration above, first all the pictures in view S0, S1, S2 at time instance T0 are coded followed by T8, T4 etc. This invention is agnostic to the order in which the pictures are encoded.

Hereinafter, we will discuss changes to the MPEG-4 AVC standard in accordance with various embodiments of the present principles. We will also show how one or more of the changes can enable parallel coding of multi-view sequences. However, it is to be appreciated that while the present principles are primarily described herein with respect to the MPEG-4 AVC standard, the present principles may be implemented with respect to extensions of the MPEG-4 AVC standard as well as other video coding standards and recommendations and extensions thereof, as readily determined by one of ordinary skill in this and related arts given the teachings of the present principles provided herein, while maintaining the scope of the present principles.

Decoded Reference Picture Marking Process

In the current MPEG-4 AVC standard, it is not permitted to have multiple pictures with the same frame_num in the decoded picture buffer (DPB). However, in accordance with an embodiment of the present principles, this restriction may be relaxed in Multi-view Video Coding (MVC), since we decouple the frame_num and/or Picture Order Count, i.e., we propose that each view have its own independent frame_num and/or Picture Order Count values. In order to allow this, in an embodiment, we associate view_id with the decoded pictures. This introduces another dimension for each picture. Thus, in an embodiment, the decoded reference picture marking process is redefined to include the view_id.

There are two methods by which the MPEG-4 AVC standard allows decoded reference picture marking. The first method for decoded reference picture marking in the MPEG-4 AVC standard involves sliding window decoded reference picture marking. The second method for decoded reference picture marking in the MPEG-4 AVC standard involves adaptive memory control decoded reference picture marking.

In accordance with various embodiments of the present principles, one or more of these methods are altered to take into account the new view_id that is present in the slice header. Table 1 illustrates the slice header syntax in accordance with an embodiment of the present principles.

TABLE 1

| slice_header( ) { | C | Descriptor |
|---|---|---|
|   first_mb_in_slice | 2 | ue(v) |
|   slice_type | 2 | ue(v) |
|   pic_parameter_set_id | 2 | ue(v) |
|   if (nal_unit_type == 22 \|\| nal_unit_type == 23) { | | |
|     view_parameter_set_id | 2 | ue(v) |
|     view_id | 2 | ue(v) |
|   } | | |
|   frame_num | 2 | u(v) |
|   if( !frame_mbs_only_flag ) { | | |
|     field_pic_flag | 2 | u(1) |
|     if( field_pic_flag ) | | |
|       bottom_field_flag | 2 | u(1) |
|   } | | |
|   ........ | | |
| } | | |

For the first method for decoded reference picture marking in the MPEG-4 AVC standard, a default behavior should be specified when there are pictures with the same frame_num/POC value but with different view_id values. One embodiment of such default behavior in accordance with the present principles is only to apply MMCO commands to those pictures with the same view_id as the current decoded picture.

For the second method for decoded reference picture marking in the MPEG-4 AVC standard, various embodiments in accordance with the present principles are provided where we introduce new Memory Management Control Operations (MMCO) commands and/or modify the existing MMCO commands in the MPEG-4 AVC standard to take into consideration the view_id of the picture that needs to be marked. One embodiment of redefining the existing MMCO (when memory_management_control_operation is equal to 1), involves the following:

Let picNumX be specified by the following:

$$picNumX=CurrPicNum-(difference\_of\_pic\_nums\_minus1+1).$$

$$viewIdX=CurrViewId-(difference\_of\_view\_ids\_minus1+1).$$

where picNumX, CurrPicNum, difference_of_pic_nums_minus1 are as defined in the current MPEG-4 AVC standard and viewIdX is the viewId of the picture that is to be marked using the MMCO command, CurrViewId is the viewId of the current decoded picture, and difference_of_view_ids_minus1 is the difference between the current viewId and the viewId of the picture that is to be marked using the MMCO command.

Additionally, for the default behavior of the sliding window decoded reference picture marking process only pictures with the same view_id as the current picture are to be considered to be marked as "unused for reference".

Figure 3:
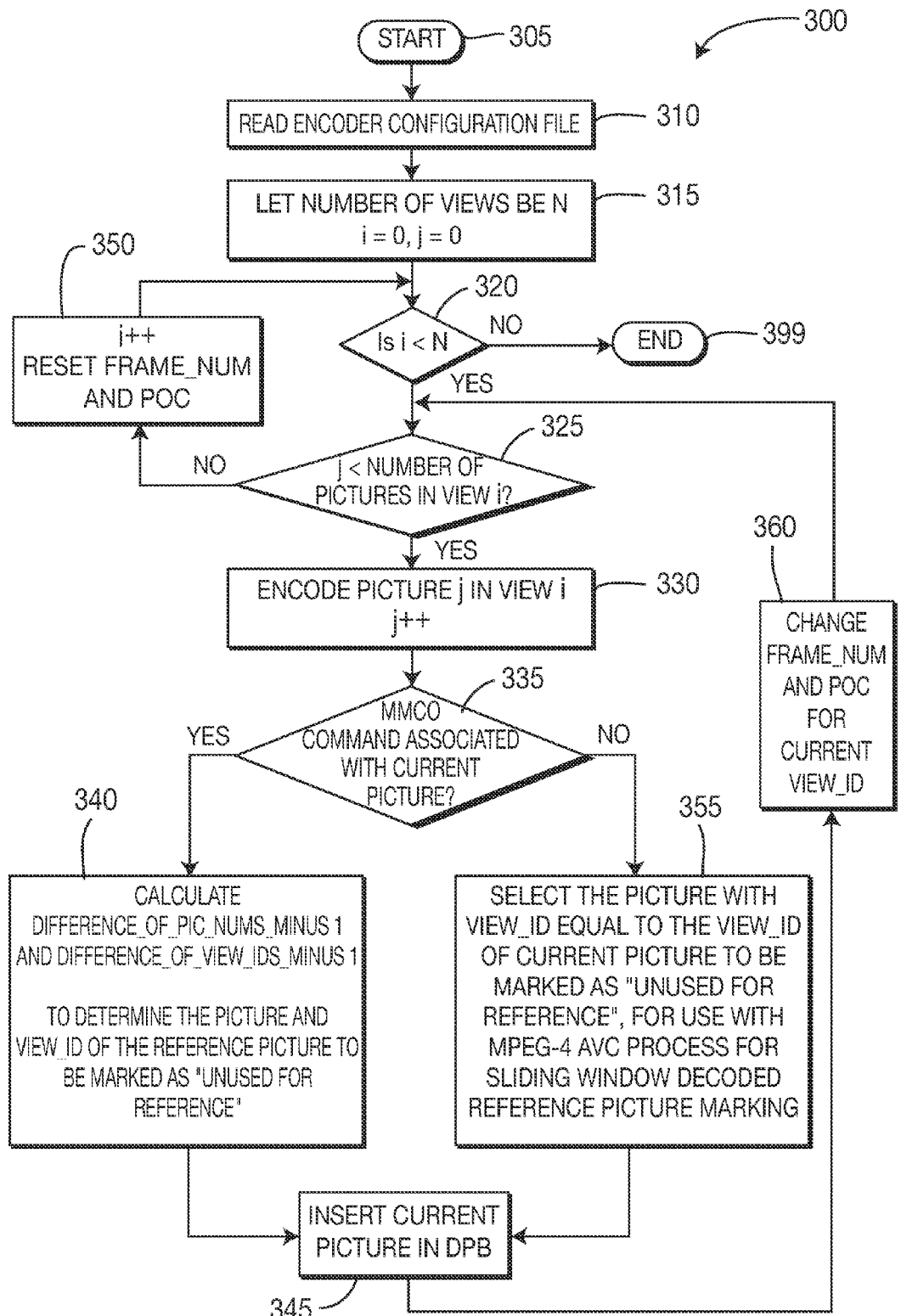
FIG. 3 is a flow diagram for an exemplary method for encoding multi-view video content using modified decoded reference picture marking, in accordance with an embodiment of the present principles.

Turning to FIG. 3, an exemplary method for encoding multi-view video content using modified decoded reference picture marking is indicated generally by the reference numeral 300 which uses view first coding.

The method 300 includes a start block 305 that passes control to a function block 310. The function block 310 reads the encoder configuration file, and passes control to a function block 315. The function block 315 lets the number of views be N, with variables i (view number index) and j (picture number index) both being set equal to zero, and passes control to a decision block 320. The decision block 320 determines whether or not i is less than N. If so, then control is passed to a decision block 325. Otherwise, control is passed to an end block 399.

The decision block 325 determines whether or not j is less than the number of pictures in view i. If so, then control is passed to a function block 330. Otherwise, control is passed to a function block 350.

The function block 330 encodes picture j in view i, increments j, and passes control to a decision block 335. The decision block 335 determines whether or not a Memory Management Control Operations (MMCO) command is associated with the current picture. If so, then control is passed to a function block 340. Otherwise, control is passed to a function block 355.

The function block 340 calculates difference_of_pic_nums_minus1 and difference_of_view_ids_minus1 to determine the picture and view_id of the reference picture to be marked as "unused for reference", and passes control to a function block 345. The function block 345 inserts the current picture in the decoded picture buffer (DPB), and passes control to a function block 360. The function block 360 changes frame_num and the Picture Order Count (POC) for the current view_id, and returns control to the function block 325.

The function block 350 increments i, resets frame_num and Picture Order Count (POC), and returns control to the decision block 320.

The function block 355 selects the picture with a view_id equal to the view_id of the current picture to be marked as "unused for reference" for use by the MPEG-4 AVC process for sliding window reference picture marking, and passes control to the function block 355.

Figure 4:
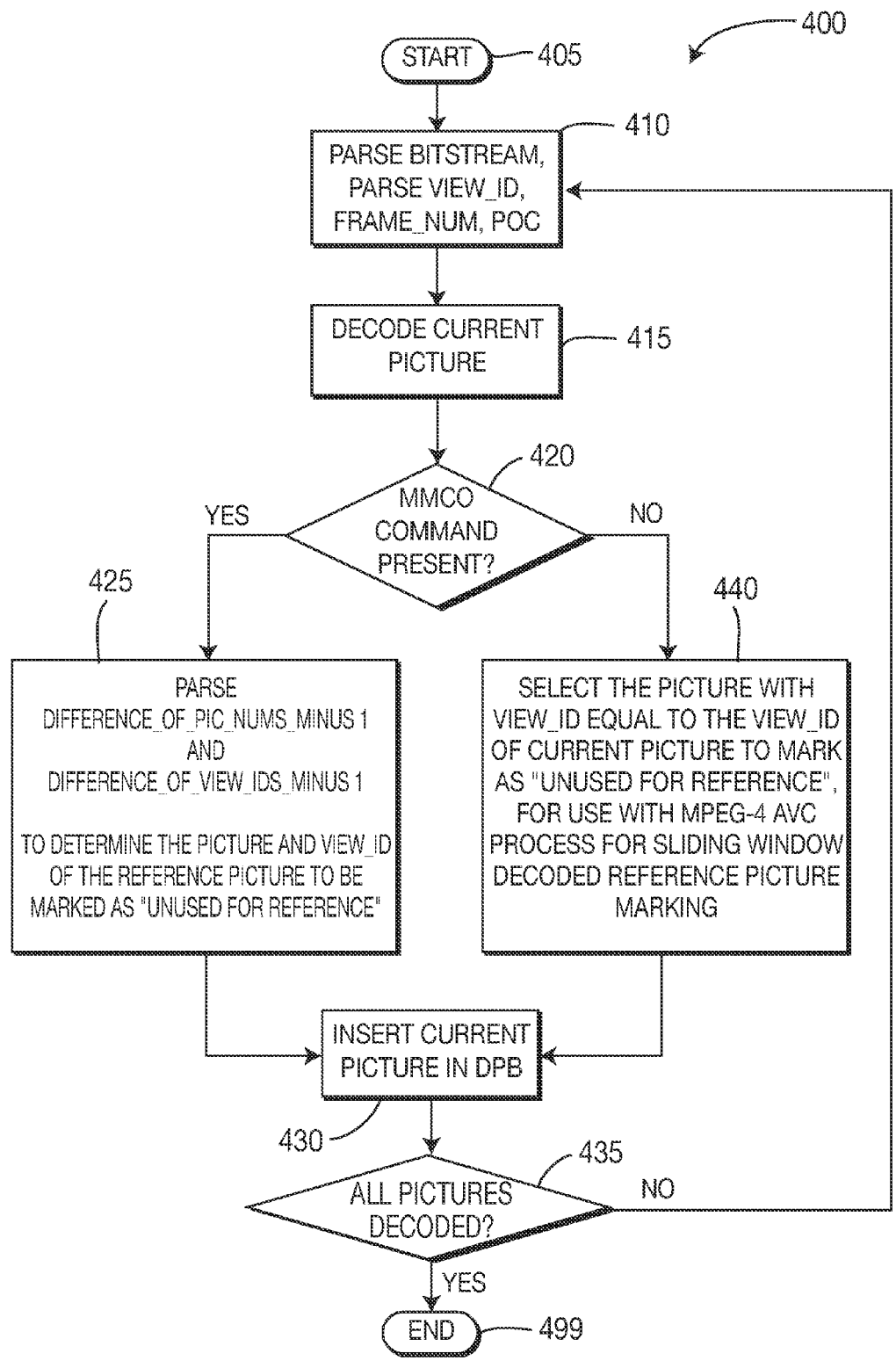
FIG. 4 is a flow diagram for an exemplary method for decoding multi-view video content using modified decoded reference picture marking, in accordance with an embodiment of the present principles.

Turning to FIG. 4, an exemplary method for decoding multi-view video content using modified decoded reference picture marking is indicated generally by the reference numeral 400.

The method 400 includes a start block 405 that passes control to a function block 410. The function block 410 parses the bitstream, view_id, frame_num, and Picture Order Count (POC), and passes control to a function block 415. The function block 415 decodes the current picture, and passes control to a decision block 420. The decision block 420 determines whether or not a Memory Management Control Operations (MMCO) command is present. If so, then control is passed to a function block 425. Otherwise, control is passed to a function block 440.

The function block 425 parses difference_of_pic_nums_minus1 and difference_of_view_ids_minus1 to determine the picture and view_id of the reference picture to be "unused for reference", and passes control to a function block 430. The function block 430 inserts the current picture in the decoder picture buffer (DPB), and passes control to a decision block 435. The decision block 435 determines whether or not all pictures have been decoded. If so, then control is passed to an end block 499. Otherwise, control is returned to the function block 410.

The function block 440 selects the picture with the view_id equal to the view_id of the current picture to be marked as "unused for reference" for use with the MPEG-4 AVC process for sliding window decoded reference picture marking, and passes control to the function block 430.

Figure 15:
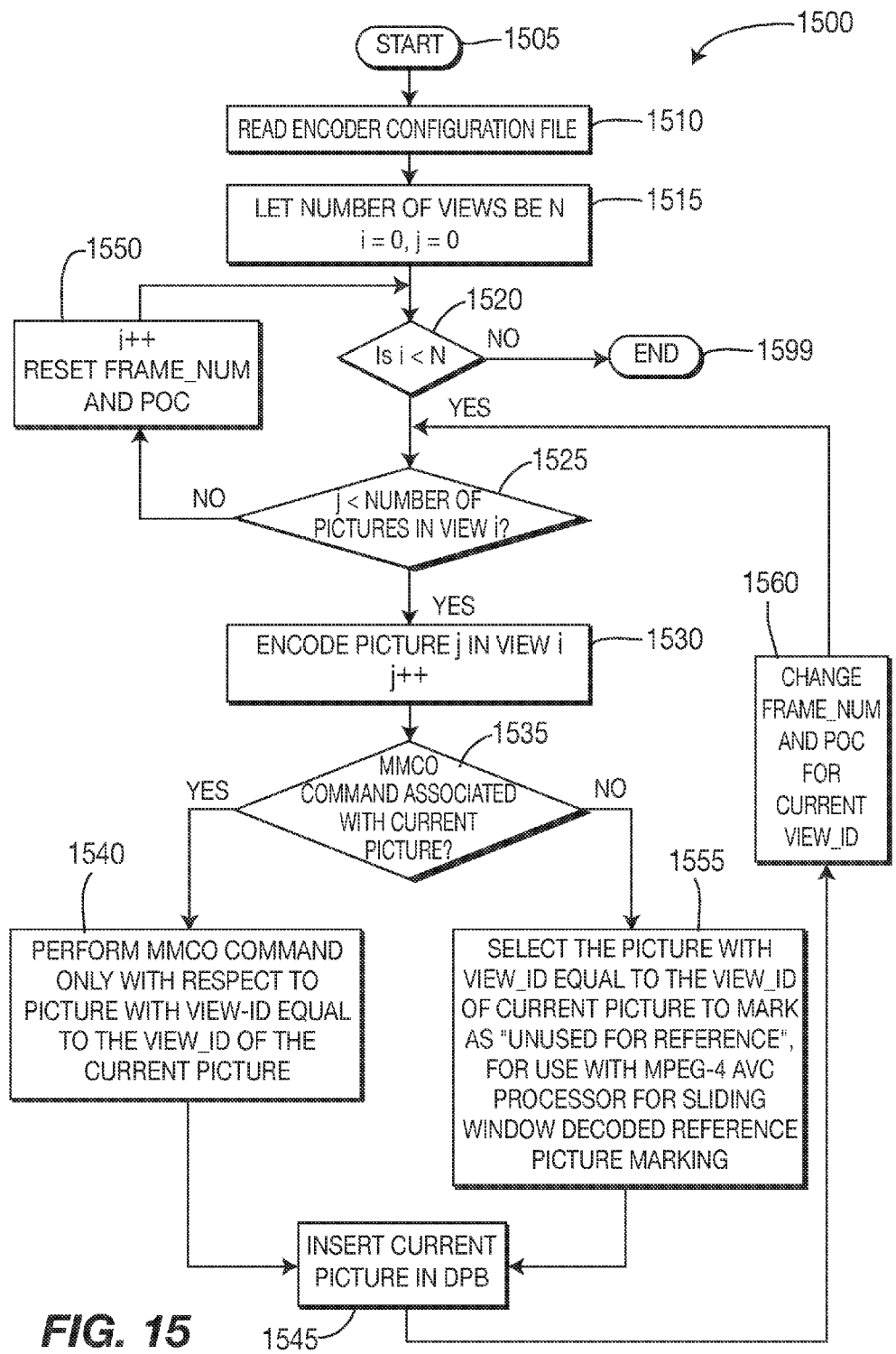
FIG. 15 is a flow diagram for an exemplary method for encoding multi-view video content using modified decoded reference picture marking, in accordance with an embodiment of the present principles.

Turning to FIG. 15, an exemplary method for encoding multi-view video content using modified decoded reference picture marking is indicated generally by the reference numeral 1500.

The method 1500 includes a start block 1505 that passes control to a function block 1510. The function block 1510 reads the encoder configuration file, and passes control to a function block 1515. The function block 1515 lets the number of views be N, with variables i (view number index) and j (picture number index) both being set equal to zero, and passes control to a decision block 1520. The decision block 1520 determines whether or not i is less than N. If so, then control is passed to a decision block 1525. Otherwise, control is passed to an end block 1599.

The decision block 1525 determines whether or not j is less than the number of pictures in view i. If so, then control is passed to a function block 1530. Otherwise, control is passed to a function block 1550.

The function block 1530 encodes picture j in view i, increments j, and passes control to a decision block 1535. The decision block 1535 determines whether or not a Memory Management Control Operations (MMCO) command is associated with the current picture. If so, then control is passed to a function block 1540. Otherwise, control is passed to a function block 1555.

The function block 1540 performs the associated MMCO command only with respect to a picture with a view_id equal to the view_id of the current picture, and passes control to a function block 1545. The function block 1545 inserts the current picture in the decoded picture buffer (DPB), and passes control to a function block 1560. The function block 1560 changes frame_num and the Picture Order Count (POC) for the current view_id, and returns control to the function block 1525.

The function block 1550 increments i, resets frame_num and Picture Order Count (POC), and returns control to the decision block 1520.

The function block 1555 selects the picture with a view_id equal to the view_id of the current picture to be marked as "unused for reference" for use by the MPEG-4 AVC process for sliding window reference picture marking, and passes control to the function block 1555.

Figure 16:
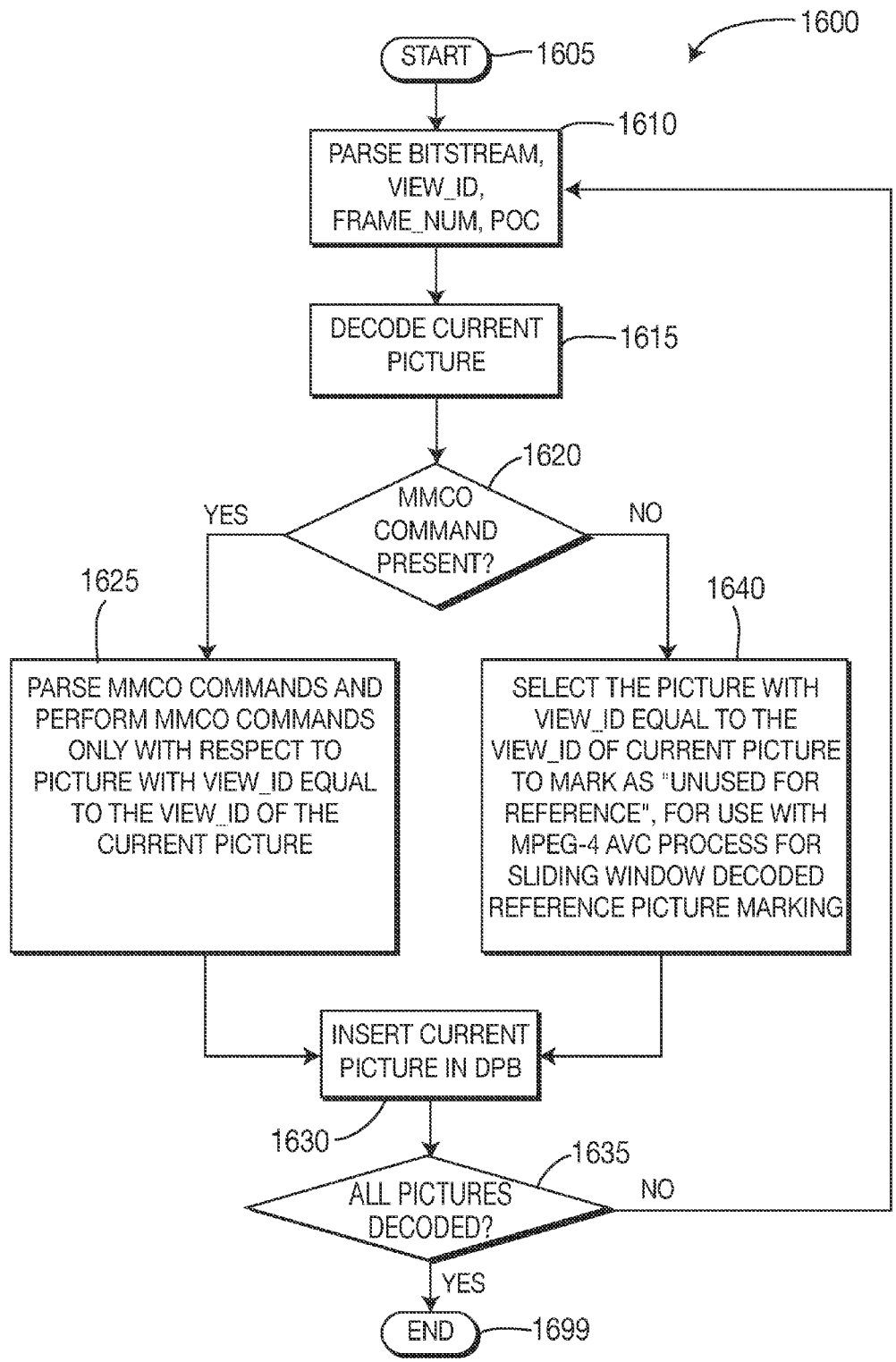
FIG. 16 is a flow diagram for an exemplary method for decoding multi-view video content using modified decoded reference picture marking, in accordance with an embodiment of the present principles.

Turning to FIG. 16, an exemplary method for decoding multi-view video content using modified decoded reference picture marking is indicated generally by the reference numeral 1600.

The method 1600 includes a start block 1605 that passes control to a function block 1610. The function block 1610 parses the bitstream, view_id, frame_num, and Picture Order Count (POC), and passes control to a function block 1615. The function block 1615 decodes the current picture, and passes control to a decision block 1620. The decision block 1620 determines whether or not a Memory Management Control Operations (MMCO) command is present. If so, then control is passed to a function block 1625. Otherwise, control is passed to a function block 1640.

The function block 1625 parses MMCO commands and performs the MMCO commands only with respect to a picture with a view_id equal to the view_id of the current picture, and passes control to a function block 1630. The function block 1630 inserts the current picture in the decoder picture buffer (DPB), and passes control to a decision block 1635. The decision block 1635 determines whether or not all pictures have been decoded. If so, then control is passed to an end block 1699. Otherwise, control is returned to the function block 1610.

The function block 1640 selects the picture with the view_id equal to the view_id of the current picture to be marked as "unused for reference" for use with the MPEG-4 AVC process for sliding window decoded reference picture marking, and passes control to the function block 1630.

However, since we allow a picture with the same frame_num/POC value to be present in the Decoder Picture Buffer (DPB), we need to distinguish between the same frame_num/POC values using view_id. In an embodiment, one or more of these processes to set the reference picture lists is changed.

One embodiment of the default initialization process to initialize the reference lists for P and B slices involves allowing only temporal reference pictures in the reference list and ignoring all pictures with a view_id that is different from the view_id of the current picture. The temporal reference pictures would follow the same default initialization process specified in the MPEG-4 AVC standard. Another embodiment involves placing only the cross-view reference in the list such that the closest view_id is placed earlier in the list. Another embodiment involves initializing the reference lists using temporal references first, then placing the cross-view reference frames at certain fixed locations, for example at the end of the reference lists under construction.

For the Reference Picture List Reordering commands to re-order the list, in an embodiment, new commands are introduced and/or the semantics of existing commands are modified to take into consideration the view_id of the picture that needs to be moved.

In an embodiment, we redefine the MPEG-4 AVC standard variables used in this process as below, so the Reference Picture List Reordering commands specified in the MPEG-4 AVC standard remains unchanged.

One embodiment where we redefine the variables of the MPEG-4 AVC standard relating to reordering the reference lists is shown below. In this embodiment, the following applies:

$$\text{FrameNum} = \text{frame\_num} * N + \text{view\_id}; \text{ and}$$

$$\text{MaxFrameNum} = 2^{(\log 2\_\text{max\_frame\_num\_minus}4+4)} * N$$

The variable CurrPicNum is derived as follows: if field_pic_flag is equal to 0, then CurrPicNum is set equal to frame_num*N+view_id; and otherwise, if field_pic_flag is equal to 1, then CurrPicNum is set equal to 2*(frame_num*N+view_id)+1.

The Picture Order Count for a slice in the MPEG-4 AVC standard is defined as follows:

```
if( picX is a frame or a complementary field pair )
    PicOrderCnt( picX ) = Min( TopFieldOrderCnt, BottomFieldOrderCnt ) of the
frame or complementary field pair picX
else if( picX is a top field )
    PicOrderCnt( picX ) = TopFieldOrderCnt of field picX
else if( picX is a bottom field )
    PicOrderCnt( picX ) = BottomFieldOrderCnt of field picX
```

Reference Picture Lists Construction

In accordance with an embodiment of the present principles, we associate view_id with the decoded reference pictures. Accordingly, in an embodiment, we redefine the initialization process for reference pictures and the reordering process for reference picture lists to include the view_id.

The MPEG-4 AVC standard specifies a default process to initialize the reference lists for P and B slices. This default process can then be modified by special Reference Picture List Reordering (RPLR) commands, which are present in the bitstream.

This default ordering and re-ordering of reference pictures is based on frame_num and Picture Order Count values.

For Multi-view Video Coding slices, the Picture Order Count is derived as follows for the decoding process for reference picture list construction and the decoded reference picture marking process:

$$\text{PicOrderCnt}(\text{pic}X) = \text{PicOrderCnt}(\text{pic}X) * N + \text{view\_id};$$

where N denotes the number of views. The number of views is indicated using a high level syntax in the bitstream and can be conveyed in-band or out-of-band. One embodiment is to include this in parameter sets of the MPEG-4 AVC standard (e.g., Sequence Parameter Set (SPS), Picture Parameter Set (PPS), or View Parameter Set (VPS)).

Another embodiment of redefining the variables of the MPEG-4 AVC standard relating to reordering the reference lists is shown below. In this embodiment, the following applies:

FrameNum=GOP_length*view_id+frame_num.

For Multi-view Video Coding slices, the Picture Order Count is derived as follows for the decoding process for reference picture list construction and decoded reference picture marking process:

PicOrderCnt(picX)=PicOrderCnt(picX)+ GOP_length*view_id, where GOP_length is defined as an anchor picture and all pictures that are temporally located between the anchor picture and the previous anchor picture for each view.

In another embodiment, we change the semantics of the existing RPLR commands such that they apply only the pictures that have the same view_id as the current view.

Figure 5:
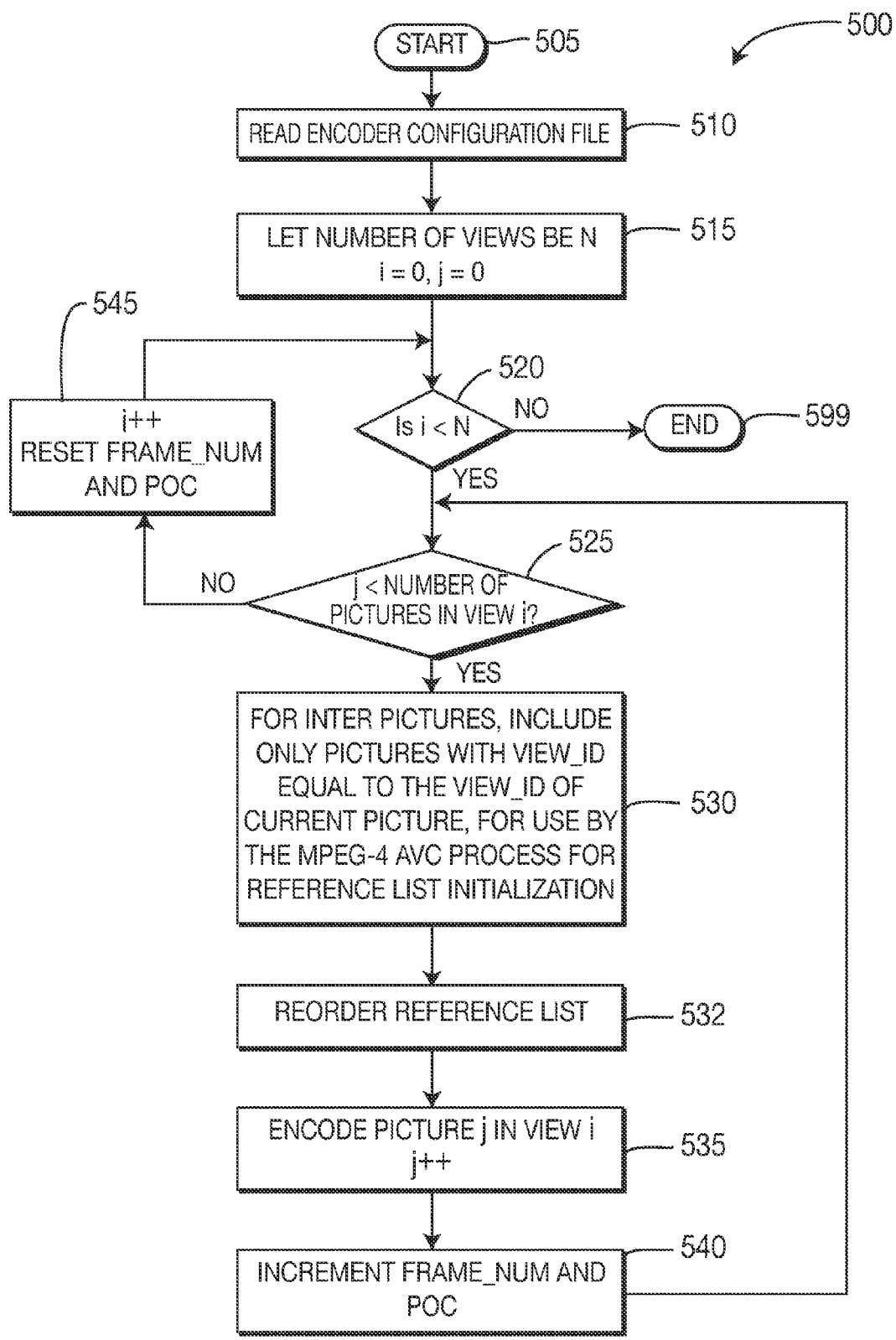
FIG. 5 is a flow diagram for an exemplary method for encoding multi-view video content using modified reference picture list construction, in accordance with an embodiment of the present principles.

Turning to FIG. 5, an exemplary method for encoding multi-view video content using modified reference picture list construction is indicated generally by the reference numeral 500. The method 500 includes a start block 505 that passes control to a function block 510. The function block 510 reads the encoder configuration file, and passes control to a function block 515. The function block 515 lets the number of views be equal to a variable N, sets variables i (view number index) and j (picture number index) to both be equal to zero, and passes control to a decision block 520. The decision block 520 determines whether or not i is less than N. If so, the control is passed to a function block 525. Otherwise, control is passed to an end block 599.

The function block 525 determines whether or not j is less than the number of pictures in view i. If so, then control is passed to a function block 530. Otherwise, control is passed to a function block 545.

The function block 530, for inter pictures, includes only pictures with a view_id equal to the view_id of the current picture for use by the MPEG-4 AVC processor for reference list initialization, and passes control to a function block 532. The function block 532 reorders the reference list, and passes control to a function block 535. The function block 535 encodes picture j in view i, increments j, and passes control to a function block 540. The function block 540 increments frame_num and Picture Order Count (POC), and returns control to the decision block 525.

The function block 545 increments i, resets frame_num and Picture Order Count (POC), and returns control to the decision block 520.

Figure 6:
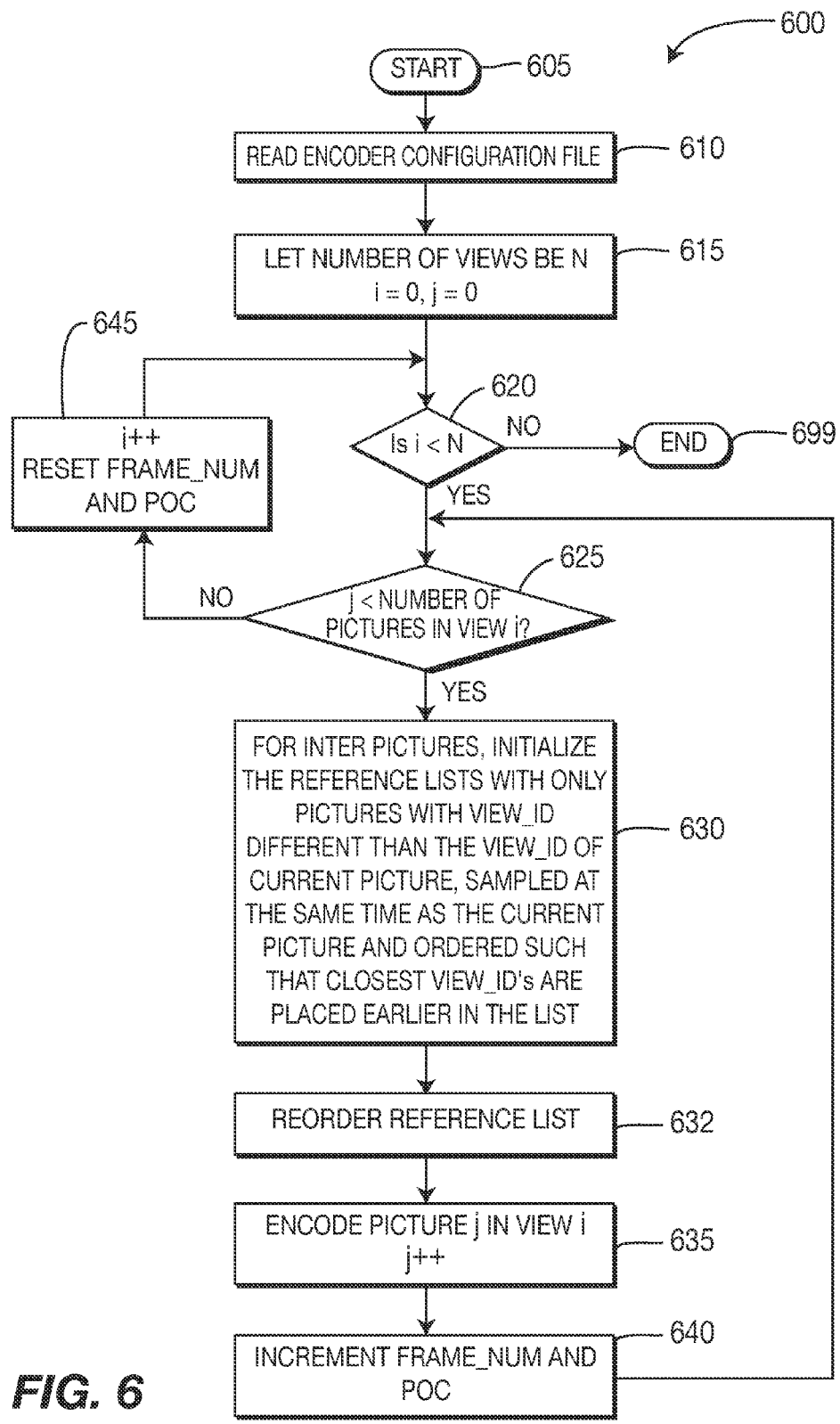
FIG. 6 is a flow diagram for another exemplary method for encoding multi-view video content using modified reference picture list construction, in accordance with an embodiment of the present principles.

Turning to FIG. 6, another exemplary method for encoding multi-view video content using modified reference picture list construction is indicated generally by the reference numeral 600.

The method 600 includes a start block 605 that passes control to a function block 610. The function block 610 reads the encoder configuration file, and passes control to a function block 615. The function block 615 lets the number of views be equal to a variable N, sets variables i (view number index) and j (picture number index) to both be equal to zero, and passes control to a decision block 620. The decision block 620 determines whether or not i is less than N. If so, the control is passed to a function block 625. Otherwise, control is passed to an end block 699.

The function block 625 determines whether or not j is less than the number of pictures in view i. If so, then control is passed to a function block 630. Otherwise, control is passed to a function block 645.

The function block 630, for inter pictures, initialize the reference lists with only pictures with a view_id different than the view_id of the current picture, sampled at the same time as the current picture and ordered such that the closest view_id's are placed earlier in the list, and passes control to a function block 632. The function block 632 reorders the reference list, and passes control to a function block 635. The function block 635 encodes picture j in view i, increments j, and passes control to a function block 640. The function block 640 increments frame_num and Picture Order Count (POC), and returns control to the decision block 625.

The function block 645 increments i, resets frame_num and Picture Order Count (POC), and returns control to the decision block 620.

Figure 7:
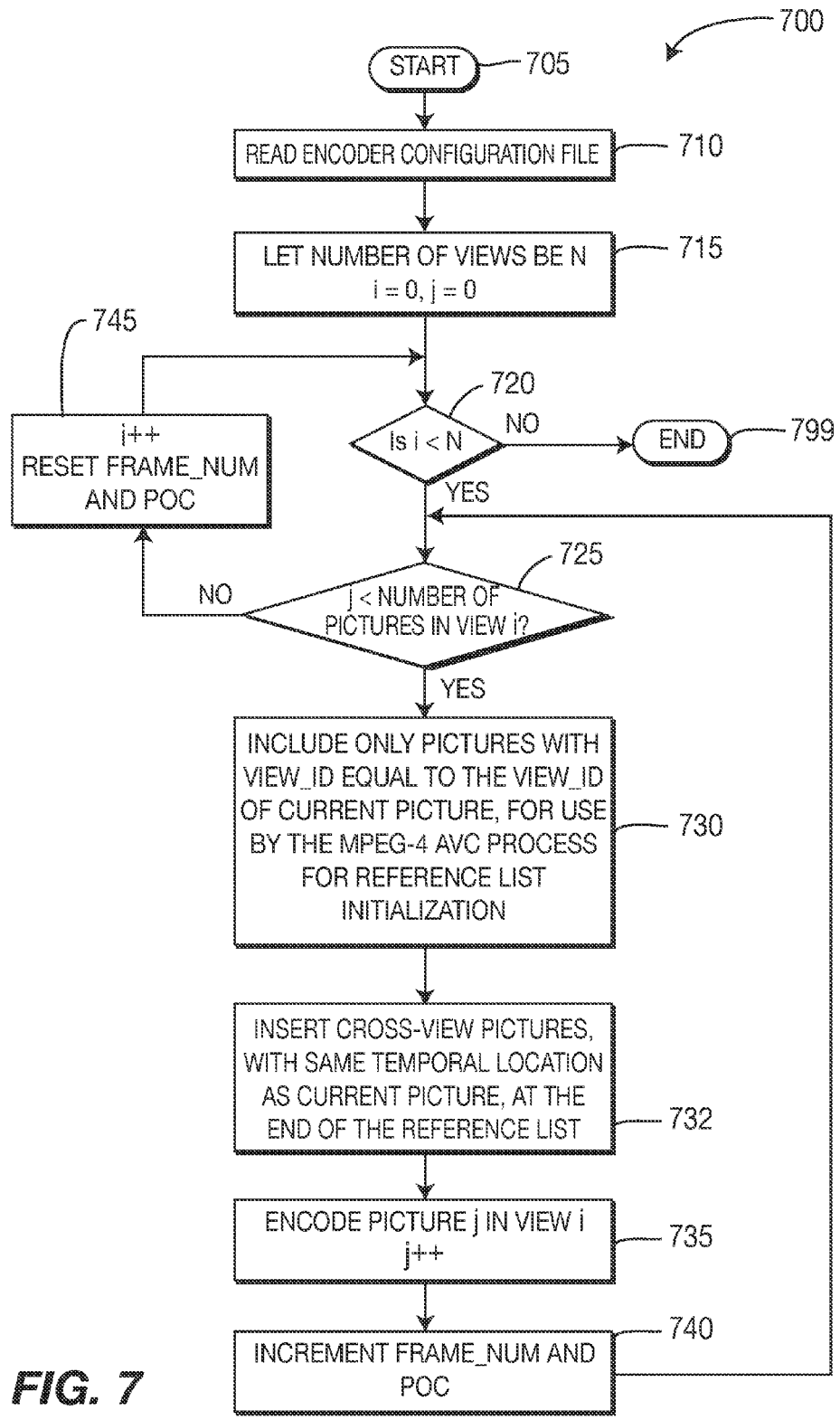
FIG. 7 is a flow diagram for yet another exemplary method for encoding multi-view video content using modified reference picture list construction, in accordance with an embodiment of the present principles.

Turning to FIG. 7, yet another exemplary method for encoding multi-view video content using modified reference picture list construction is indicated generally by the reference numeral 700.

The method 700 includes a start block 705 that passes control to a function block 710. The function block 710 reads the encoder configuration file, and passes control to a function block 715. The function block 715 lets the number of views be equal to a variable N, sets variables i (view number index) and j (picture number index) to both be equal to zero, and passes control to a decision block 720. The decision block 720 determines whether or not i is less than N. If so, the control is passed to a function block 725. Otherwise, control is passed to an end block 799.

The function block 725 determines whether or not j is less than the number of pictures in view i. If so, then control is passed to a function block 730. Otherwise, control is passed to a function block 745.

The function block 730 includes only pictures with a view_id equal to the view_id of the current picture for use by the MPEG-4 AVC processor for reference list initialization, and passes control to a function block 732. The function block 732 inserts cross-view pictures, with the same temporal location as the current picture, at the end of the reference list, and passes control to a function block 735. The function block 735 encodes picture j in view i, increments j, and passes control to a function block 740. The function block 740 increments frame_num and Picture Order Count (POC), and returns control to the decision block 725.

The function block 745 increments i, resets frame_num and Picture Order Count (POC), and returns control to the decision block 720.

Turning to FIG. 8, an exemplary method for decoding multi-view video content using modified reference picture list construction is indicated generally by the reference numeral 800. The method 800 includes a start block 805 that passes control to a function block 810. The function block 810 parses the bitstream, view_id, frame_num, and Picture Order Count (POC), and passes control to a function block 815. The function block 815 includes only pictures with a view_id equal to the view_id of the current picture for use by the MPEG-4 AVC process for reference list initialization, and passes control to a function block 820. The function block 820 decodes the current picture, and passes control to a function block 825. The function block 825 inserts the current picture in the decoded picture buffer, and passes control to a decision block 830. The decision block 830 determines whether or not all pictures have been decoded. If so, then control is passed to an end block 899. Otherwise, control is returned to the function block 810.

Turning to FIG. 9, another exemplary method for decoding multi-view video content using modified reference picture list construction is indicated generally by the reference numeral 900. The method 900 includes a start block 905 that passes control to a function block 910. The function block 910 parses the bitstream, view_id, frame_num, and Picture Order Count (POC), and passes control to a function block 915. The function block 915 initializes the reference lists with only pictures with a view_id different than the view_id of the current picture, sampled at the same time as the current picture and ordered such that the closest view_id's are placed earlier in the list, and passes control to a function block 920. The function block 920 decodes the current picture, and passes control to a function block 925. The function block 925 inserts the current picture in the decoded picture buffer (DPB), and passes control to a decision block 930. The decision block 930 determines whether or not all pictures have been decoded. If so, then control is passed to an end block 999. Otherwise, control is returned to the function block 910.

Figure 10:
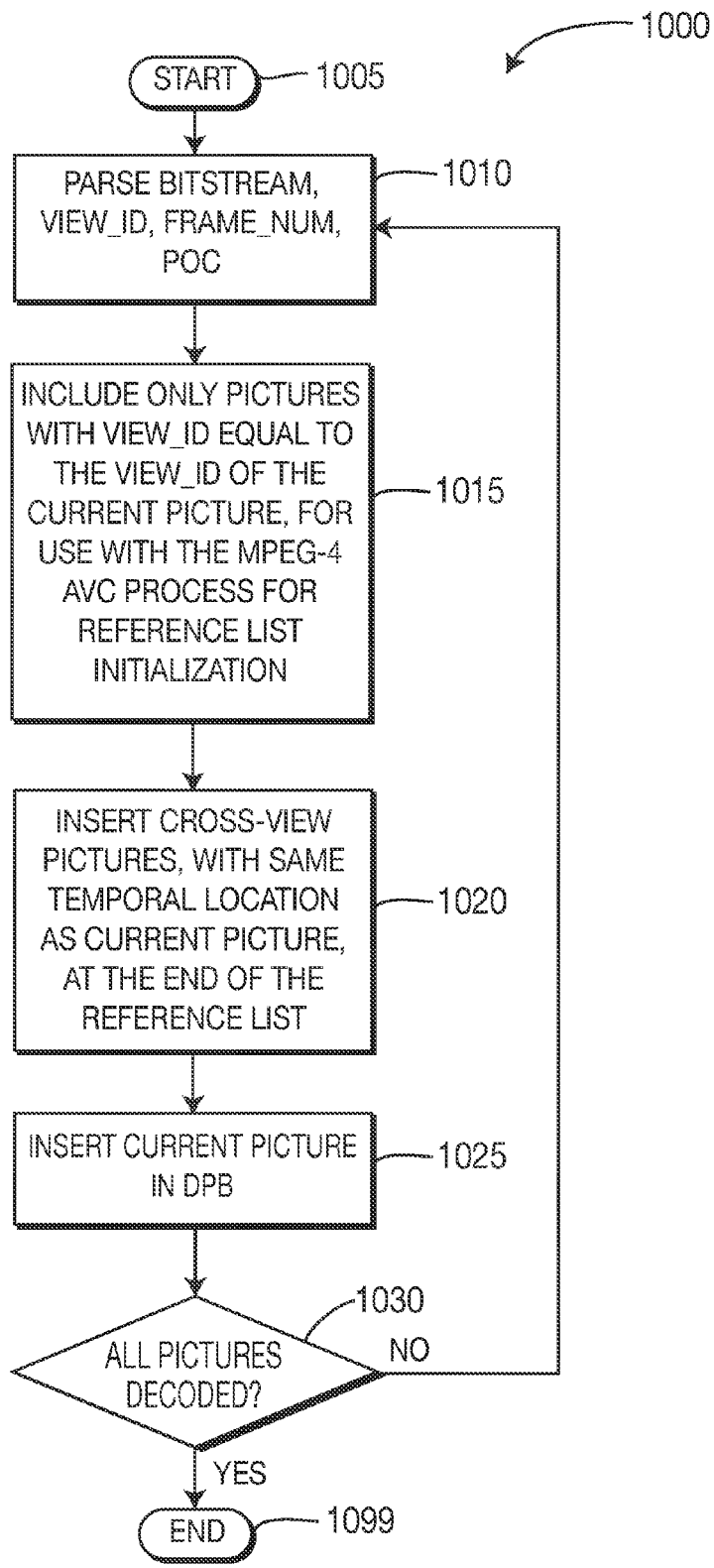
FIG. 10 is a flow diagram for yet another exemplary method for decoding multi-view video content using modified reference picture list construction, in accordance with an embodiment of the present principles.

Turning to FIG. 10, yet another exemplary method for decoding multi-view video content using modified reference picture list construction is indicated generally by the reference numeral 1000. The method 1000 includes a start block 1005 that passes control to a function block 1010. The function block 1010 parses the bitstream, view_id, frame_num, and Picture Order Count (POC), and passes control to a function block 1015. The function block 1015 includes only pictures with a view_id equal to the view_id of the current picture for use by the MPEG-4 AVC process for reference list initialization, and passes control to a function block 1020. The function block 1020 inserts cross-view pictures, with the same temporal location as the current picture, at the end of the reference list, and passes control to a function block 1025. The function block 1025 inserts the current picture in the decoded picture buffer, and passes control to a decision block 1030. The decision block 1030 determines whether or not all pictures have been decoded. If so, then control is passed to an end block 1099. Otherwise, control is returned to the function block 1010.

Figure 17:
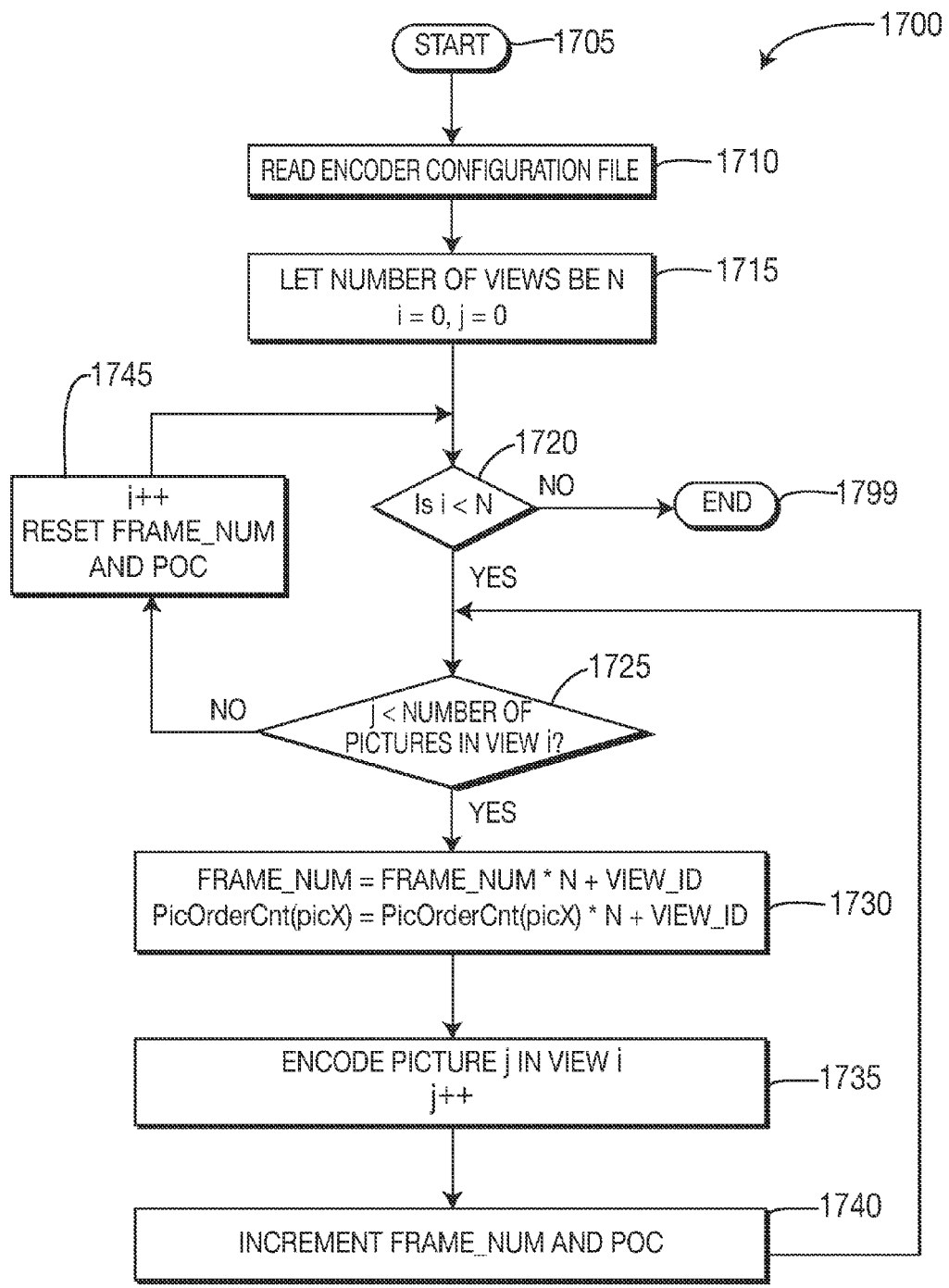
FIG. 17 is a flow diagram for an exemplary method for encoding multi-view video content using modified reference picture list construction and frame number calculation, in accordance with an embodiment of the present principles.

Turning to FIG. 17, an exemplary method for encoding multi-view video content using modified reference picture list construction and frame number calculation is indicated generally by the reference numeral 1700.

The method 1700 includes a start block 1705 that passes control to a function block 1710. The function block 1710 reads the encoder configuration file, and passes control to a function block 1715. The function block 1715 lets the number of views be equal to a variable N, sets variables i (view number index) and j (picture number index) to both be equal to zero, and passes control to a decision block 1720. The decision block 1720 determines whether or not i is less than N. If so, the control is passed to a function block 1725. Otherwise, control is passed to an end block 1799.

The function block 1725 determines whether or not j is less than the number of pictures in view i. If so, then control is passed to a function block 1730. Otherwise, control is passed to a function block 1745.

The function block 1730 sets frame_num=frame_num*N+view_id, sets PicOrderCnt(picX)=PicOrderCnt(picX)*N+view_id, and passes control to a function block 1735. The function block 1735 encodes picture j in view i, increments j, and passes control to a function block 1740. The function block 1740 increments frame_num and Picture Order Count (POC), and returns control to the decision block 1725.

The function block 1745 increments i, resets frame_num and Picture Order Count (POC), and returns control to the decision block 1720.

Figure 18:
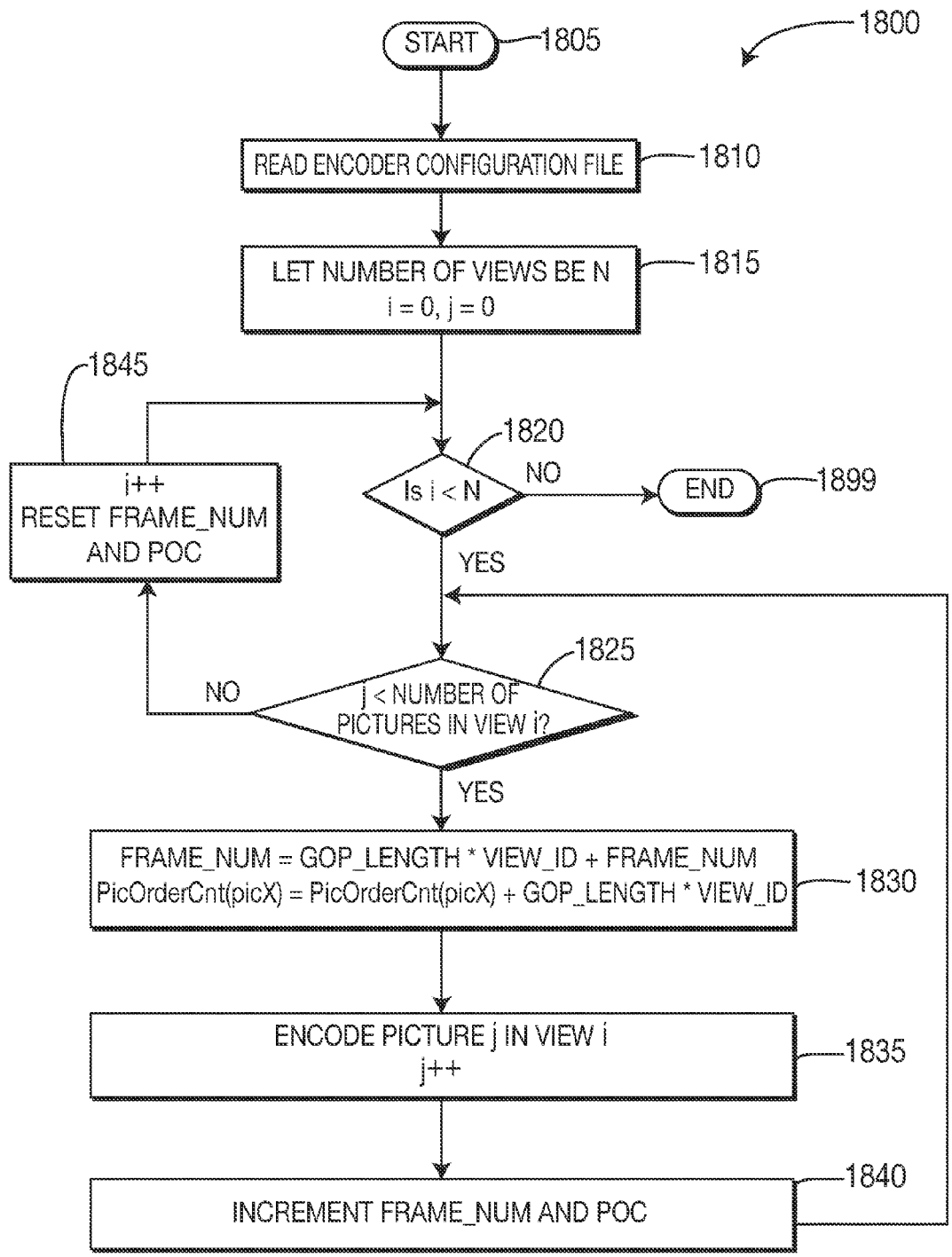
FIG. 18 is a flow diagram for another exemplary method for encoding multi-view video content using modified reference picture list construction and frame number calculation, in accordance with an embodiment of the present principles.

Turning to FIG. 18, another exemplary method for encoding multi-view video content using modified reference picture list construction and frame number calculation is indicated generally by the reference numeral 1800.

The method 1800 includes a start block 1805 that passes control to a function block 1810. The function block 1810 reads the encoder configuration file, and passes control to a function block 1815. The function block 1815 lets the number of views be equal to a variable N, sets variables i (view number index) and j (picture number index) to both be equal to zero, and passes control to a decision block 1820. The decision block 1820 determines whether or not i is less than N. If so, the control is passed to a function block 1825. Otherwise, control is passed to an end block 1899.

The function block 1825 determines whether or not j is less than the number of pictures in view i. If so, then control is passed to a function block 1830. Otherwise, control is passed to a function block 1845.

The function block 1830 sets frame_num=GOP_length*view_id+frame_num, sets PicOrderCnt(picX)=PicOrderCnt(PicX)+GOP_length* view_id, and passes control to a function block 1835. The function block 1835 encodes picture j in view i, increments j, and passes control to a function block 1840. The function block 1840 increments frame_num and Picture Order Count (POC), and returns control to the decision block 1825.

The function block 1845 increments i, resets frame_num and Picture Order Count (POC), and returns control to the decision block 1820.

Figure 19:
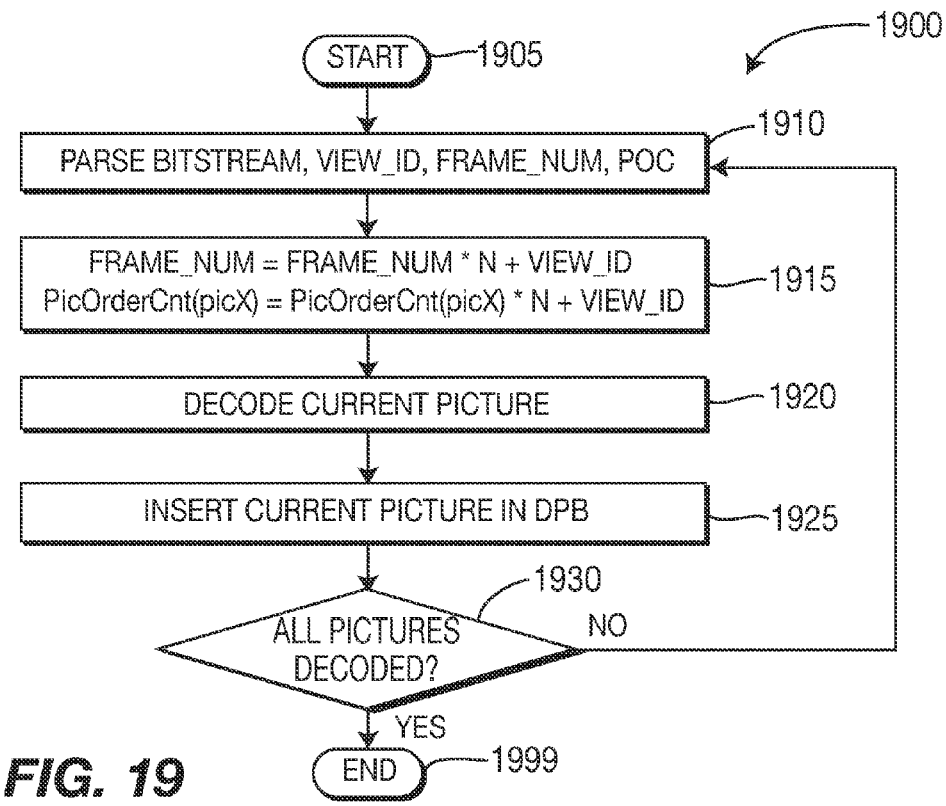
FIG. 19 is a flow diagram for an exemplary method for decoding multi-view video content using modified reference picture list construction and frame number calculation, in accordance with an embodiment of the present principles.

Turning to FIG. 19, an exemplary method for decoding multi-view video content using modified reference picture list construction and frame number calculation is indicated generally by the reference numeral 1900. The method 1900 includes a start block 1905 that passes control to a function block 1910. The function block 910 parses the bitstream, view_id, frame_num, and Picture Order Count (POC), and passes control to a function block 1915. The function block 1915 sets frame_num=frame_num*N+view_id, sets PicOrderCnt(picX)=PicOrderCnt(picX)*N+view_id, and passes control to a function block 1920. The function block 1920 decodes the current picture, and passes control to a function block 1925. The function block 1925 inserts the current picture in the decoded picture buffer (DPB), and passes control to a decision block 1930. The decision block 1930 determines whether or not all pictures have been decoded. If so, then control is passed to an end block 1999. Otherwise, control is returned to the function block 1910.

Figure 20:
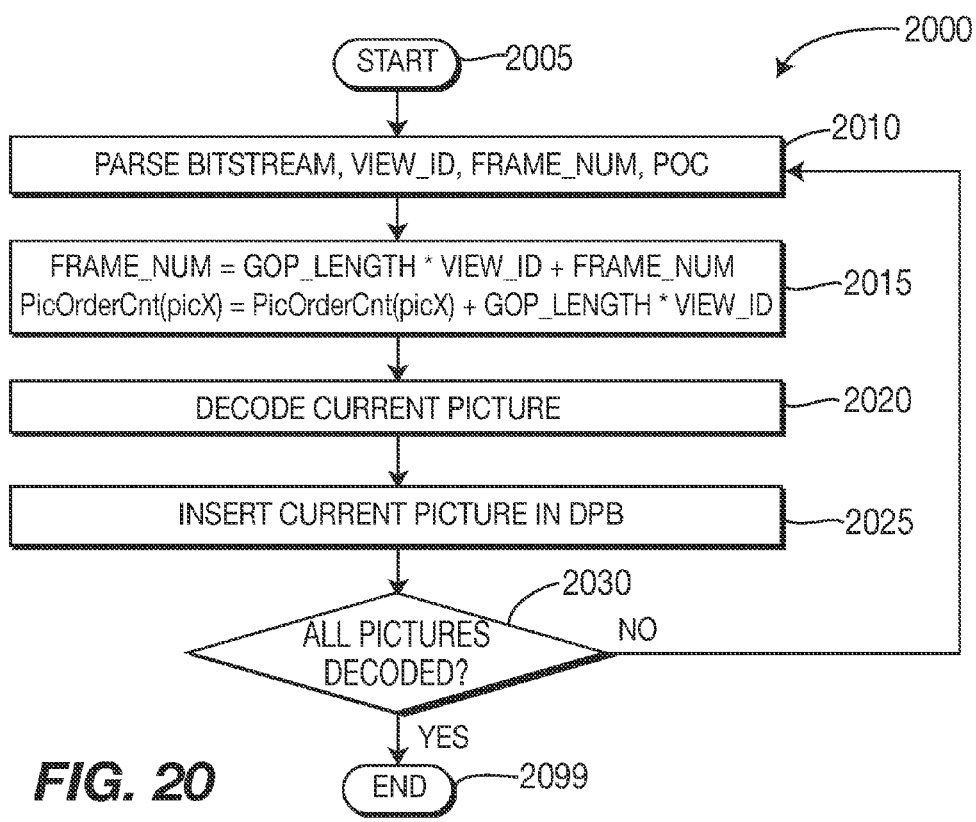
FIG. 20 is a flow diagram for another exemplary method for decoding multi-view video content using modified reference picture list construction and frame number calculation, in accordance with an embodiment of the present principles.

Turning to FIG. 20, another exemplary method for decoding multi-view video content using modified reference picture list construction and frame number calculation is indicated generally by the reference numeral 2000. The method 2000 includes a start block 2005 that passes control to a function block 2010. The function block 2010 parses the bitstream, view_id, frame_num, and Picture Order Count (POC), and passes control to a function block 2015. The function block 2015 sets frame_num=GOP_length*view_id_frame_num, sets PicOrderCnt(picX)=PicOrderCnt(picX)+GOP_length* view_id, and passes control to a function block 2020. The function block 2020 decodes the current picture, and passes control to a function block 2025. The function block 2025 inserts the current picture in the decoded picture buffer (DPB), and passes control to a decision block 2030.

The decision block 2030 determines whether or not all pictures have been decoded. If so, then control is passed to an end block 2099. Otherwise, control is returned to the function block 2010.

Figure 21:
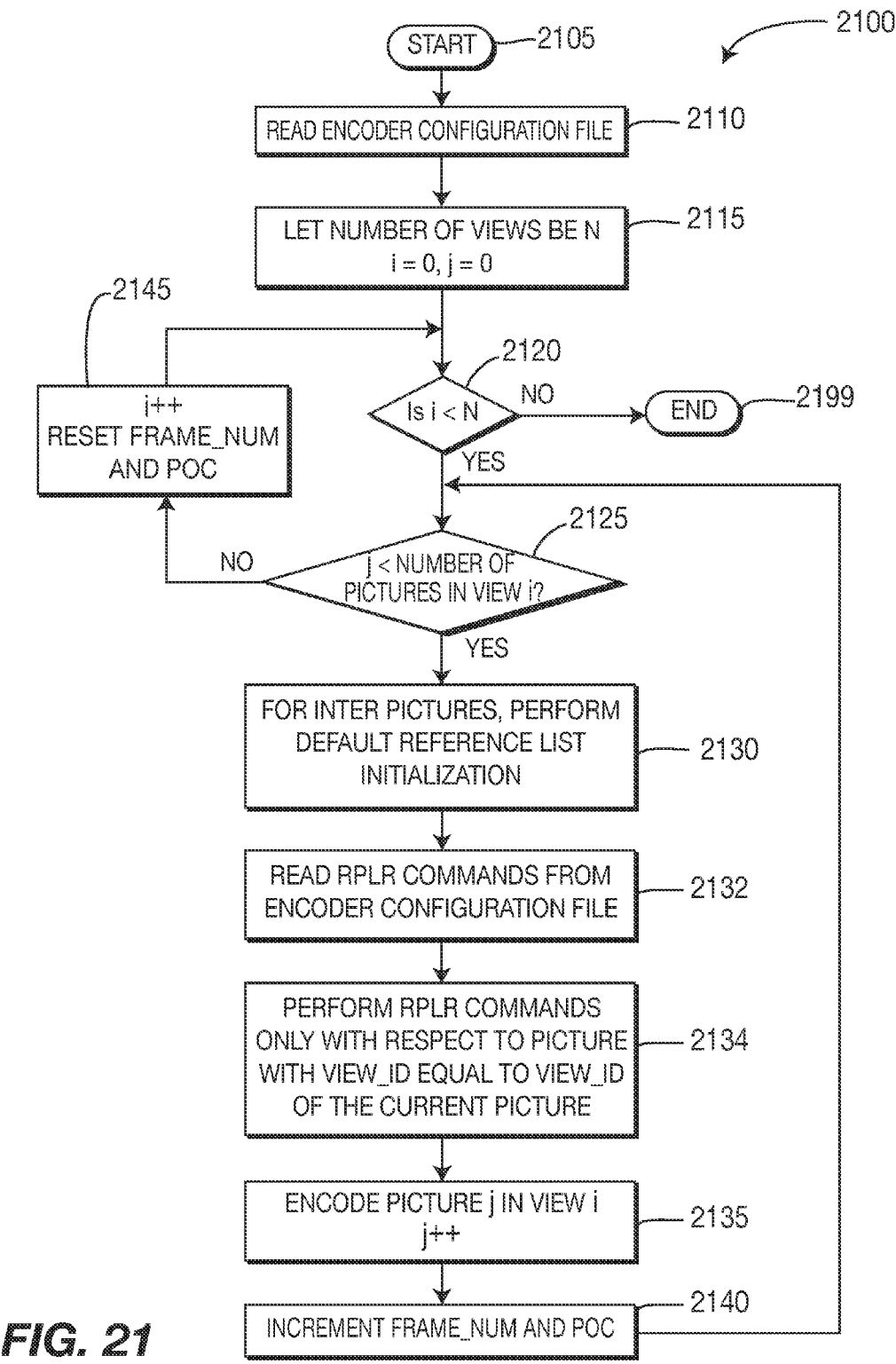
FIG. 21 is a flow diagram for an exemplary method for encoding multi-view video content using modified reference picture list initialization with Reference Picture List Reordering (RPLR) commands, in accordance with an embodiment of the present principles.

Turning to FIG. 21, an exemplary method for encoding multi-view video content using modified reference picture list initialization with Reference Picture List Reordering (RPLR) commands is indicated generally by the reference numeral 2100.

The method 2100 includes a start block 2105 that passes control to a function block 2110. The function block 2110 reads the encoder configuration file, and passes control to a function block 2115. The function block 2115 lets the number of views be equal to a variable N, sets variables i (view number index) and (picture number index) to both be equal to zero, and passes control to a decision block 2120. The decision block 2120 determines whether or not i is less than N. If so, the control is passed to a function block 2125. Otherwise, control is passed to an end block 2199.

The function block 2125 determines whether or not j is less than the number of pictures in view i. If so, then control is passed to a function block 2130. Otherwise, control is passed to a function block 2145.

The function block 2130, for inter pictures, performs default reference list initialization, and passes control to a function block 2132. The function block 2132 reads RPLR commands from the encoder configuration file, and passes control to a function block 2134. The function block 2134 performs the RPLR commands only with respect to the picture with a view_id equal to the view_id of the current picture, and passes control to a function block 2135. The function block 2135 encodes picture j in view i, increments j, and passes control to a function block 2140. The function block 2140 increments frame_num and Picture Order Count (POC), and returns control to the decision block 2130.

The function block 2145 increments i, resets frame_num and Picture Order Count (POC), and returns control to the decision block 2120.

Figure 22:
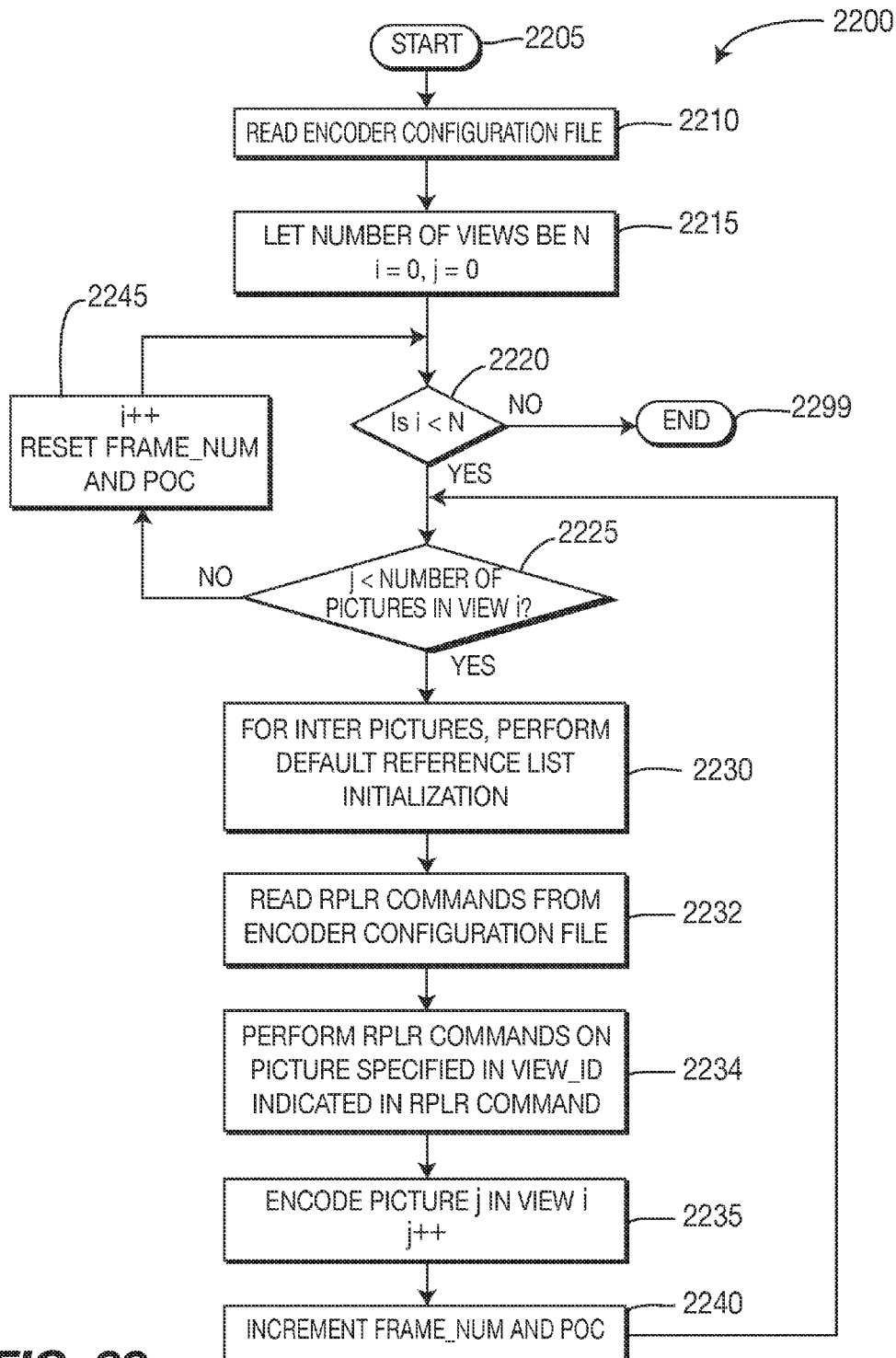
FIG. 22 is a flow diagram for another exemplary method for encoding multi-view video content using modified reference picture list initialization with Reference Picture List Reordering (RPLR) commands, in accordance with an embodiment of the present principles.

Turning to FIG. 22, another exemplary method for encoding multi-view video content using modified reference picture list initialization with Reference Picture List Reordering (RPLR) commands is indicated generally by the reference numeral 2200.

The method 2200 includes a start block 2205 that passes control to a function block 2210. The function block 2210 reads the encoder configuration file, and passes control to a function block 2215. The function block 2215 lets the number of views be equal to a variable N, sets variables i (view number index) and j (picture number index) to both be equal to zero, and passes control to a decision block 2220. The decision block 2220 determines whether or not i is less than N. If so, the control is passed to a function block 2225. Otherwise, control is passed to an end block 2299.

The function block 2225 determines whether or not j is less than the number of pictures in view i. If so, then control is passed to a function block 2230. Otherwise, control is passed to a function block 2245.

The function block 2230, for inter pictures, performs default reference list initialization, and passes control to a function block 2232. The function block 2232 reads RPLR commands from the encoder configuration file, and passes control to a function block 2234. The function block 2234 performs the RPLR commands on the picture specified in the view_id indicated in the RPLR command, and passes control to a function block 2235. The function block 2235 encodes picture j in view i, increments j, and passes control to a function block 2240. The function block 2240 increments frame_num and Picture Order Count (POC), and returns control to the decision block 2230.

The function block 2245 increments i, resets frame_num and Picture Order Count (POC), and returns control to the decision block 2220.

Turning to FIG. 23, an exemplary method for decoding multi-view video content using modified reference picture list construction with Reference Picture List Reordering (RPLR) commands is indicated generally by the reference numeral 2300. The method 2300 includes a start block 2305 that passes control to a function block 2310. The function block 2310 parses the bitstream, view_id, frame_num, and Picture Order Count (POC), and passes control to a function block 2315. The function block 2315 includes only pictures with a view_id equal to the view_id of the current picture for use by the MPEG-4 AVC process for reference list initialization, and passes control to a function block 2317. The function block 2317 reads the RPLR commands, and passes control to a function block 2319. The function block 2319 performs the RPLR commands only with respect to a picture with a view_id equal to the view_id of the current picture, and passes control to a function block 2320. The function block 2320 decodes the current picture, and passes control to a function block 2325. The function block 2325 inserts the current picture in the decoded picture buffer, and passes control to a decision block 2330. The decision block 2330 determines whether or not all pictures have been decoded. If so, then control is passed to an end block 2399. Otherwise, control is returned to the function block 2310.

Turning to FIG. 24, another exemplary method for decoding multi-view video content using modified reference picture list construction with Reference Picture List Reordering (RPLR) commands is indicated generally by the reference numeral 2400. The method 2400 includes a start block 2405 that passes control to a function block 2410. The function block 2410 parses the bitstream, view_id, frame_num, and Picture Order Count (POC), and passes control to a function block 2415. The function block 2415 includes only pictures with a view_id equal to the view_id of the current picture for use by the MPEG-4 AVC process for reference list initialization, and passes control to a function block 2417. The function block 2417 reads the RPLR commands, and passes control to a function block 2419. The function block 2419 performs the RPLR commands only with respect to a picture with a view_id equal to the view_id of the current picture, and passes control to a function block 2420. The function block 2420 decodes the current picture, and passes control to a function block 2425. The function block 2325 inserts the current picture in the decoded picture buffer, and passes control to a decision block 2430. The decision block 2430 determines whether or not all pictures have been decoded. If so, then control is passed to an end block 2499. Otherwise, control is returned to the function block 2410.

Temporal DIRECT Mode

As mentioned above, temporal DIRECT mode uses the Picture Order Count information to derive the motion vector for a given macroblock. Since we decouple the frame_num and/or Picture Order Count values, introduce the view_id for each view of multi-view video content, and allow placing cross-view pictures in the decoder picture buffer and reference lists, in an embodiment, we also refine this mode to handle the derivations correctly where cross-view pictures refer to the pictures from a view that is different from the current view.

In temporal DIRECT mode, we have the following exemplary cases:

(1) picture in ref list 1 and picture in ref list 0 have different POC and same view_id;

(2) picture in ref list 1 and picture in ref list 0 have different POC and different view_id;

(3) picture in ref list 1 and picture in ref list 0 have same POC and different view_id; and (4) picture in ref list 1 and picture in ref list 0 have same POC and same view_id.

One embodiment of obtaining the motion vector in temporal DIRECT mode is to use the existing MPEG-4 AVC method of simply ignoring the view_id information present in the bitstream. In another embodiment, we redefine temporal DIRECT mode to take into consideration view_id information along with the Picture Order Count information.

Implicit Weighted Prediction

Similar to temporal DIRECT mode, implicit weighted prediction (as discussed above) also uses Picture Order Count values to determine the weights to be applied to the reference pictures. As a result, in an embodiment, all the changes that apply to temporal DIRECT mode will indirectly fix the implicit weighted prediction mode. In another embodiment, the method to obtain weights in implicit weighted prediction mode can be redefined to take into consideration view_id information along with the Picture Order Count information. For example, we may calculate the Picture Order Count by taking into consideration the view_id information and the number of views as described above and thereafter take the difference between Picture Order Counts in order to obtain the required values to perform implicit weighted prediction.

Figure 11:
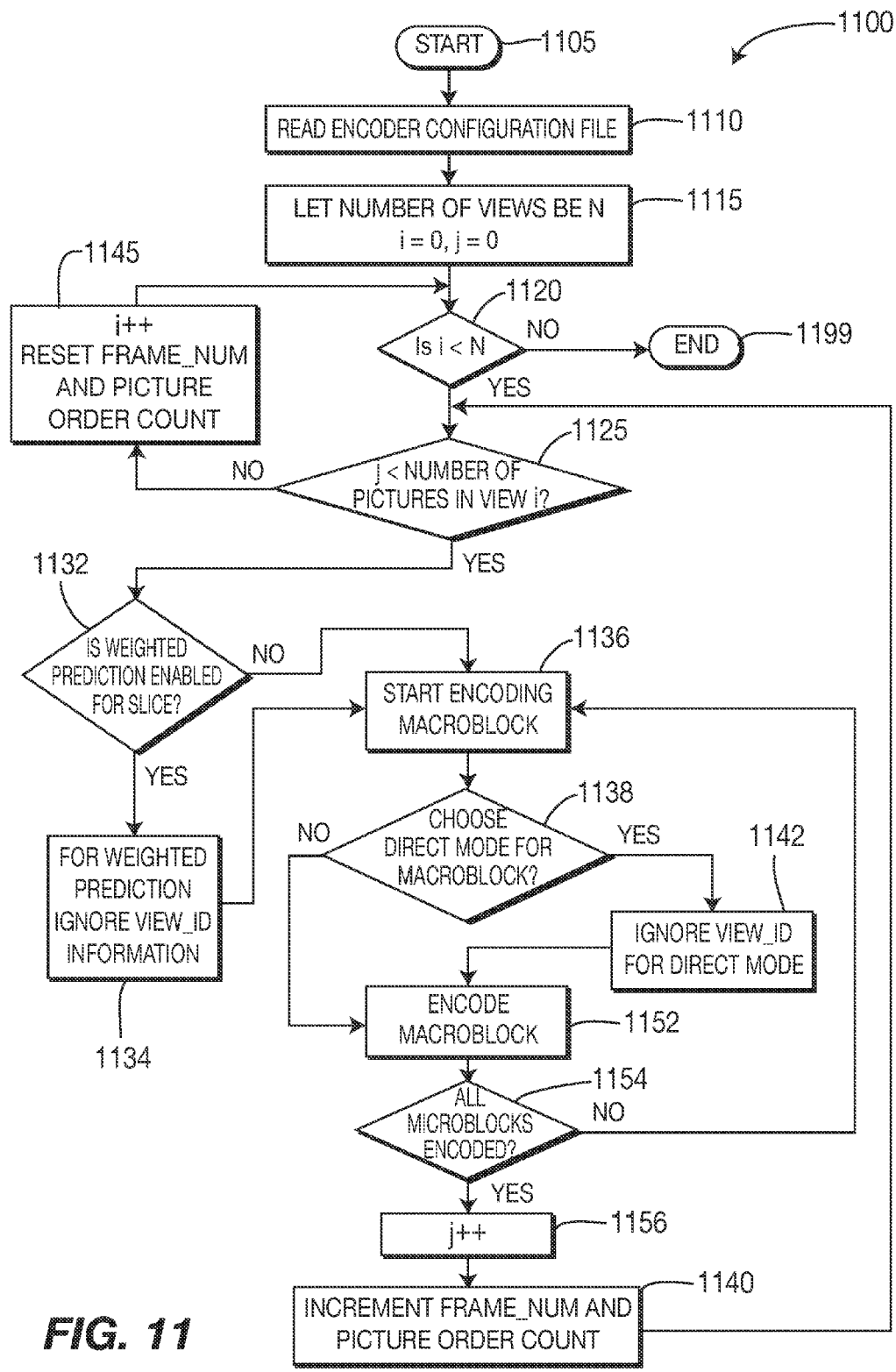
FIG. 11 is a flow diagram for an exemplary method for encoding multi-view video content using temporal DIRECT mode and implicit weighted prediction, in accordance with an embodiment of the present principles.

Turning to FIG. 11, an exemplary method for encoding multi-view video content using temporal DIRECT mode and implicit weighted prediction is indicated generally by the reference numeral 1100.

The method 1100 includes a start block 1105 that passes control to a function block 1110. The function block 1110 reads the encoder configuration file, and passes control to a function block 1115. The function block 1115 lets the number of views be equal to a variable N, sets variables i (view number index) and j (picture number index) to both be equal to zero, and passes control to a decision block 1120. The decision block 1120 determines whether or not i is less than N. If so, the control is passed to a function block 1125. Otherwise, control is passed to an end block 1199.

The function block 1125 determines whether or not j is less than the number of pictures in view i. If so, then control is passed to a decision block 1132. Otherwise, control is passed to a function block 1145.

The decision block 1132 determines whether or not weighted prediction is enabled for the current slice. If so, then control is passed to a function block 1134. Otherwise, control is passed to a function block 1136.

The function block 1134 ignores view_id information for weighted prediction, and passes control to the function block 1136.

The function block 1136 starts encoding a current macroblock, and passes control to a decision block 1138. The decision block 1138 determines whether or not to choose direct mode for the macroblock. If so, then control is passed to a function block 1142. Otherwise, control is passed to a function block 1152.

The function block 1142 ignores view_id for direct mode, and passes control to the function block 1152.

The function block 1152 encodes the current macroblock, and passes control to a decision block 1154. The decision block 1154 determines whether or not all macroblock have been encoded. If so, the control is passed to a function block 1156. Otherwise, control is returned to the function block 1136.

The function block 1156 increment the variable j, and passes control to a function block 1140. The function block 1140 increments fram_num and Picture Order Count, and returns control to the decision block 1125.

The function block 1145 increments i, resets fram_num and Picture Order Count, and returns control to the decision block 1120.

Figure 12:
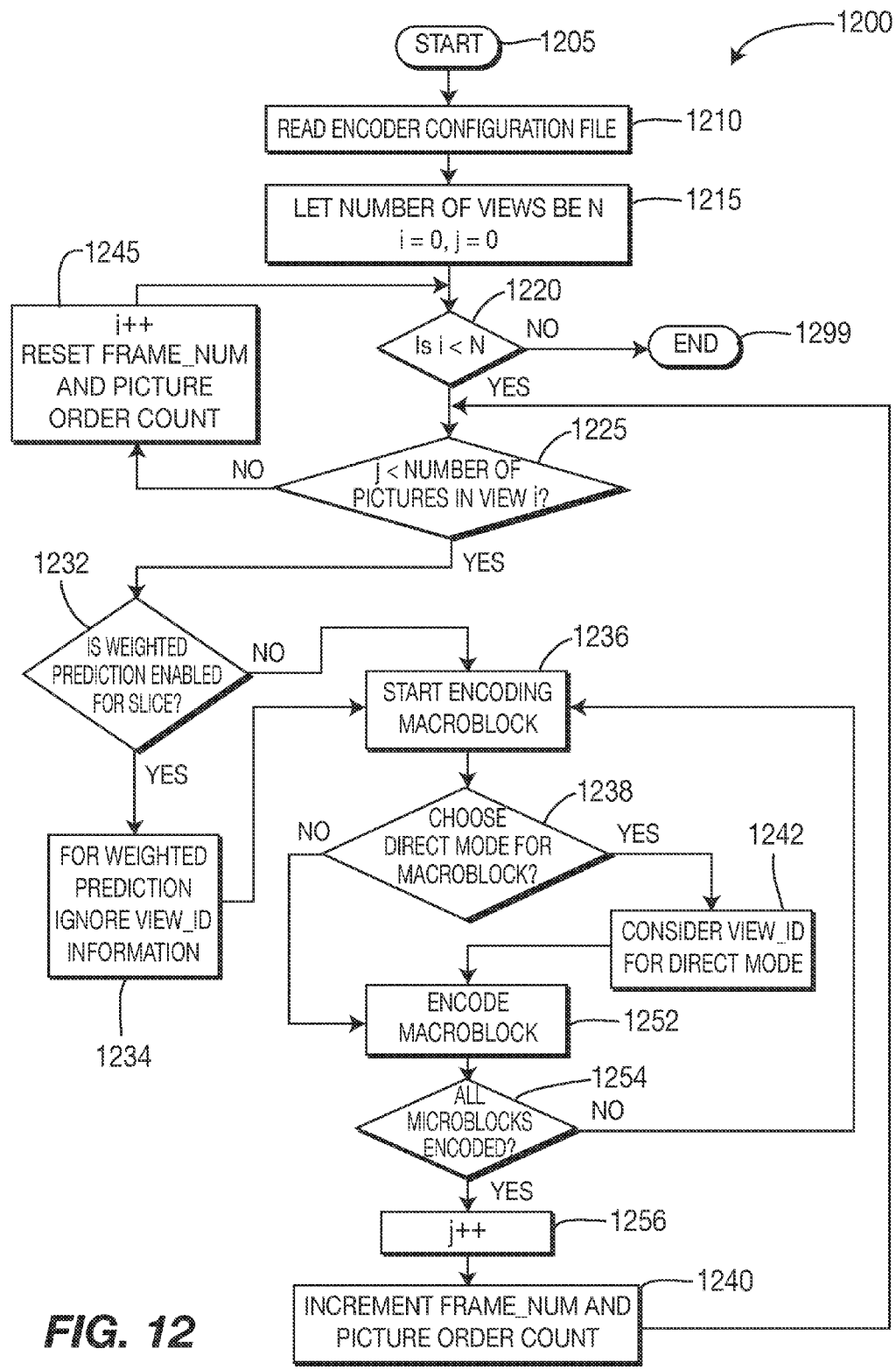
FIG. 12 is a flow diagram for another exemplary method encoding multi-view video content using temporal DIRECT mode and implicit weighted prediction, in accordance with an embodiment of the present principles.

Turning to FIG. 12, another exemplary method encoding multi-view video content using temporal DIRECT mode and implicit weighted prediction is indicated generally by the reference numeral 1200.

The method 1200 includes a start block 1205 that passes control to a function block 1210. The function block 1210 reads the encoder configuration file, and passes control to a function block 1215. The function block 1215 lets the number of views be equal to a variable N, sets variables i (view number index) and j (picture number index) to both be equal to zero, and passes control to a decision block 1220. The decision block 1220 determines whether or not i is less than N. If so, the control is passed to a function block 1225. Otherwise, control is passed to an end block 1299.

The function block 1225 determines whether or not j is less than the number of pictures in view i. If so, then control is passed to a decision block 1232. Otherwise, control is passed to a function block 1245.

The decision block 1232 determines whether or not weighted prediction is enabled for the current slice. If so, then control is passed to a function block 1234. Otherwise, control is passed to a function block 1236.

The function block 1234 ignores view_id information for weighted prediction, and passes control to the function block 1236.

The function block 1236 starts encoding a current macroblock, and passes control to a decision block 1238. The decision block 1238 determines whether or not to choose direct mode for the macroblock. If so, then control is passed to a function block 1242. Otherwise, control is passed to a function block 1252.

The function block 1242 considers view_id for direct mode, and passes control to the function block 1252.

The function block 1252 encodes the current macroblock, and passes control to a decision block 1254. The decision block 1254 determines whether or not all macroblock have been encoded. If so, the control is passed to a function block 1256. Otherwise, control is returned to the function block 1236.

The function block 1256 increment the variable j, and passes control to a function block 1240. The function block 1240 increments fram_num and Picture Order Count, and returns control to the decision block 1225.

The function block 1245 increments i, resets fram_num and Picture Order Count, and returns control to the decision block 1220.

Figure 13:
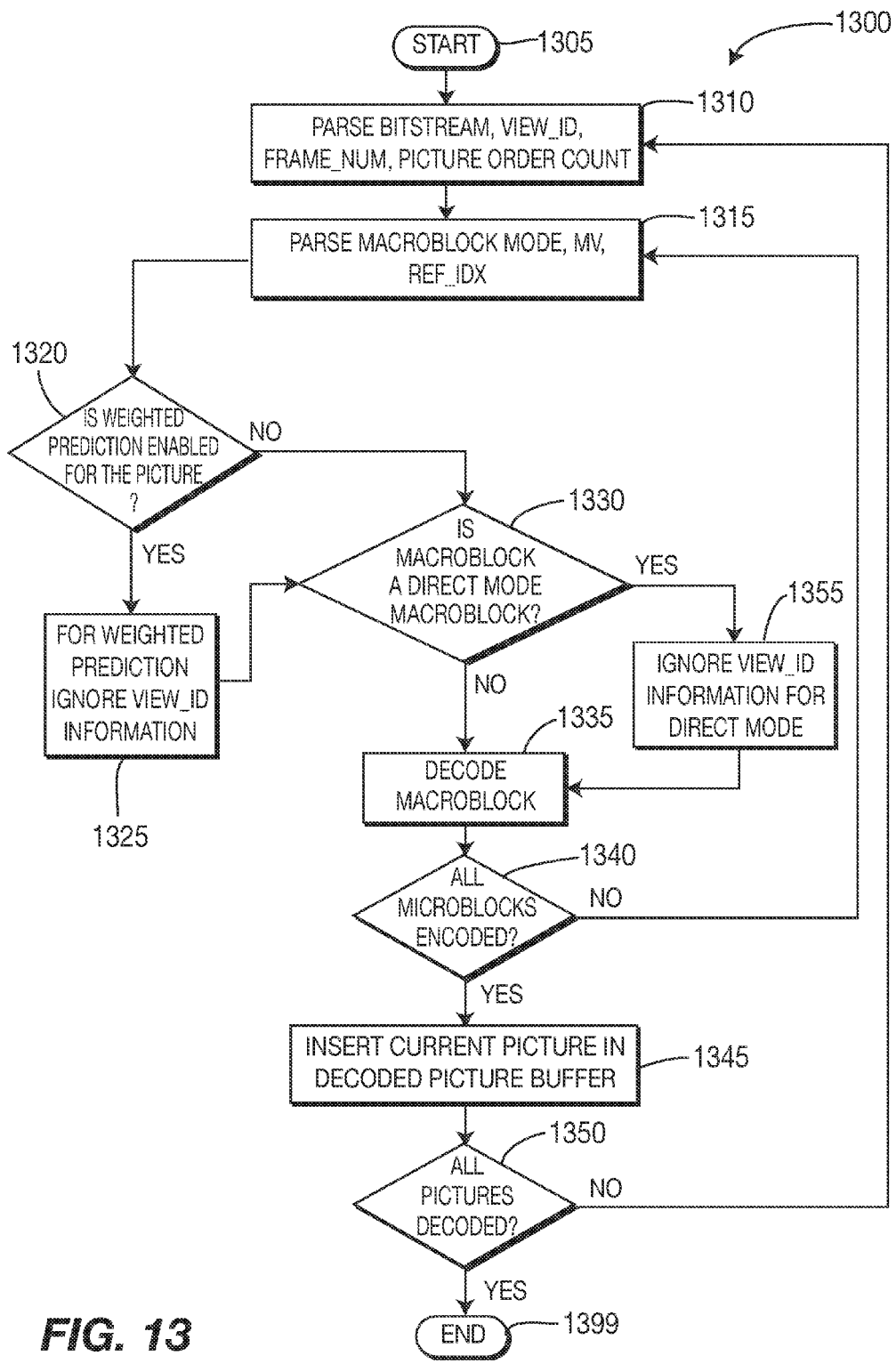
FIG. 13 is a flow diagram for an exemplary method for decoding multi-view video content using modified decoded reference picture marking, in accordance with an embodiment of the present principles.

Turning to FIG. 13, an exemplary method for decoding multi-view video content using modified decoded reference picture marking is indicated generally by the reference numeral 1300.

The method 1300 includes a start block 1305 that passes control to a function block 1310. The function block 1310 parses the bitstream, view_id, frame_num, and Picture Order Count (POC), and passes control to a function block 1315. The function block 1315 parses the macroblock mode, the motion vector, ref_idx, and passes control to a decision block 1320. The decision block 1320 determines whether or not weighted prediction is enabled for the picture. If so, the control is passed to a function block 1325. Otherwise, control is passed to a decision block 1330.

The function block 1325 ignores view_id information for weighted prediction, and passes control to the decision block 1330.

The decision block 1330 determines whether or not a macroblock is a direct mode macroblock. If so, then control is passed to a function block 1355. Otherwise, control is passed to a function block 1335.

The function block 1355 ignores view_id information for direct mode, and passes control to a function block 1335.

The function block 1335 decodes the current macroblock, and passes control to a decision block 1340. The decision block 1340 determines whether or not all macroblocks have been decoded. If so, the control is passed to a function block 1345. Otherwise, control is returned to the function block 1315.

The function block 1345 inserts the current picture in the decoded picture buffer, and passes control to a decision block 1350. The decision block 1350 determines whether or not all pictures have been decoded. If so, the control is passed to an end block 1399. Otherwise, control is returned to the function block 1310.

Figure 14:
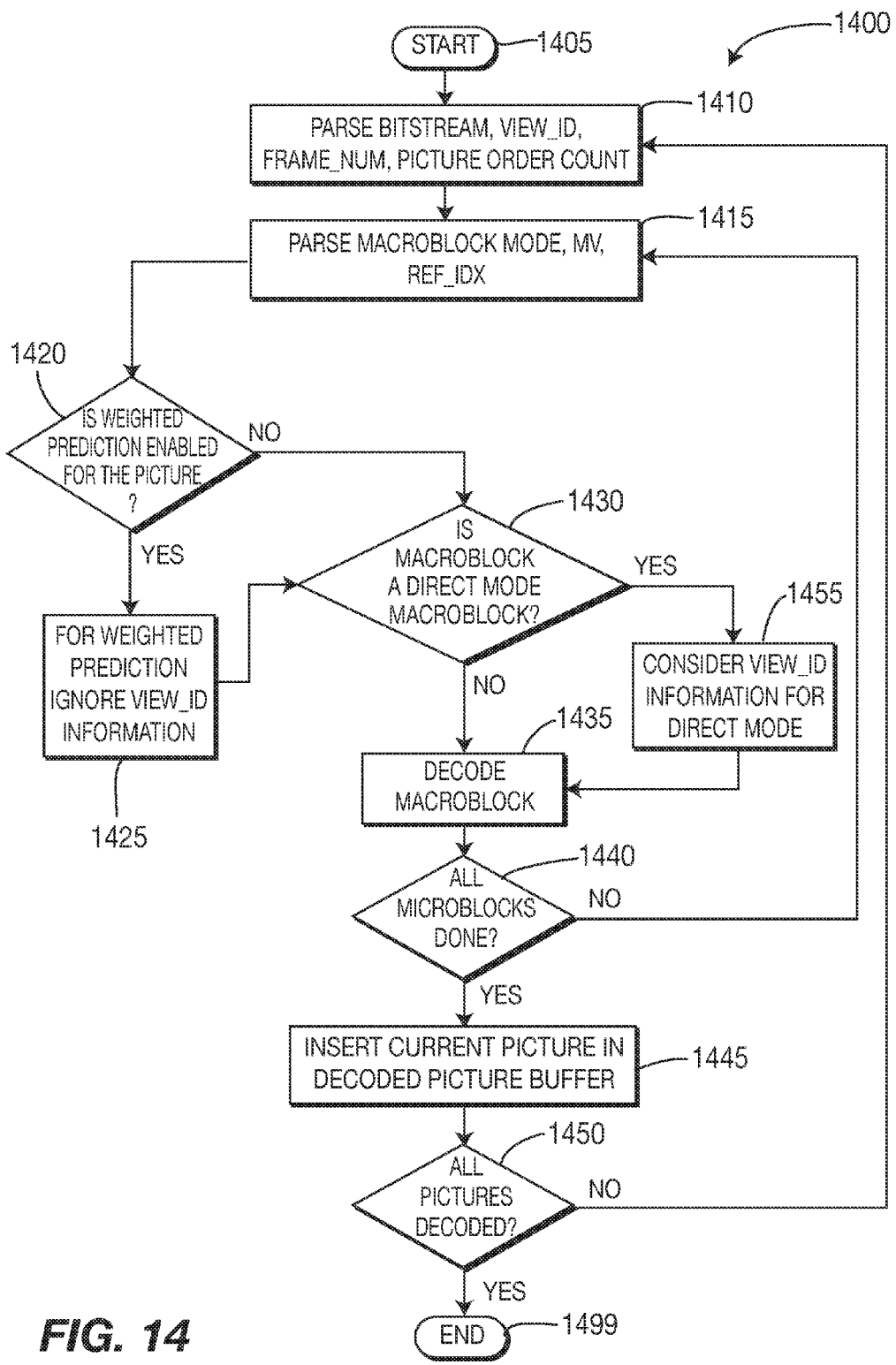
FIG. 14 is a flow diagram for another exemplary method for decoding multi-view video content using modified decoded reference picture marking, in accordance with an embodiment of the present principles.

Turning to FIG. 14, another exemplary method for decoding multi-view video content using modified decoded reference picture marking is indicated generally by the reference numeral 1400.

The method 1400 includes a start block 1405 that passes control to a function block 1410. The function block 1410 parses the bitstream, frame_num, and Picture Order Count (POC), and passes control to a function block 1415. The function block 1415 parses the macroblock mode, the motion vector, ref_idx, and passes control to a decision block 1420. The decision block 1420 determines whether or not weighted prediction is enabled for the picture. If so, the control is passed to a function block 1425. Otherwise, control is passed to a decision block 1430.

The function block 1425 ignores view_id information for weighted prediction, and passes control to the decision block 1430.

The decision block 1430 determines whether or not a macroblock is a direct mode macroblock. If so, then control is passed to a function block 1455. Otherwise, control is passed to a function block 1435.

The function block 1455 considers view_id information for direct mode, and passes control to a function block 1435.

The function block 1435 decodes the current macroblock, and passes control to a decision block 1440. The decision block 1440 determines whether or not all macroblocks have been decoded. If so, the control is passed to a function block 1445. Otherwise, control is returned to the function block 1415.

The function block 1445 inserts the current picture in the decoded picture buffer, and passes control to a decision block 1450. The decision block 1450 determines whether or not all pictures have been decoded. If so, the control is passed to an end block 1499. Otherwise, control is returned to the function block 1410.

Parallel Coding of MVC

Due to the amount of data involved in the processing of multi-view video content sequences, support for parallel encoding/decoding in Multi-view Video Coding is very important for many applications, especially those with a real-time constraint. In the current MPEG-4 AVC compliant implementation of Multi-view Video Coding, cross-view prediction is enabled but there is no provision to distinguish temporal references from cross-view references. By adding view_id support in the Multi-view Video Coding encoder and/or decoder and including view_id's in the construction of decoded reference picture management and reference list construction as we proposed herein, the data dependency between parallel processing engines is clearly defined, which facilitates parallel implementation for the MVC codec.

A description will now be given of some of the many attendant advantages/features of the present invention, some of which have been mentioned above. For example, one advantage/feature is an apparatus that includes an encoder for encoding at least one picture corresponding to at least one of at least two views of multi-view video content to form a resultant bitstream. In the resultant bitstream at least one of coding order information and output order information for the at least one picture is decoupled from the at least one view to which the at least one picture corresponds.

Another advantage/feature is the apparatus having the encoder as described above, wherein the encoder decouples the at least one of the coding order information and output order information for the at least one picture using at least one existing syntax element (frame_num and pic_order_cnt_lsb) corresponding to the International Organization for Standardization/International Electrotechnical Commission Moving Picture Experts Group-4 Part 10 Advanced Video Coding standard/International Telecommunication Union, Telecommunication Sector H.264 recommendation.

Yet another advantage/feature is the apparatus having the encoder as described above, wherein the encoder decouples the at least one of the coding order information and output order information for the at least one picture using a view identifier.

Yet still another advantage/feature is the apparatus having the encoder that decouples the at least one of the coding order information and output order information for the at least one picture using the view identifier as described above, wherein the view identifier is present at a slice level in the resultant bitstream.

Yet still a further advantage/feature is the apparatus having the encoder that decouples the at least one of the coding order information and output order information for the at least one picture using the view identifier as described above, wherein the view identifier is present at a level higher than a macroblock level in the resultant bitstream.

Moreover, another advantage/feature is the apparatus having the encoder that decouples the at least one of the coding order information and output order information for the at least one picture using the view identifier present at the higher level as described above, wherein the encoder includes the view identifier in the resultant bitstream for use by a decoded reference picture marking process.

Further, another advantage/feature is the apparatus having the encoder that includes the view identifier in the resultant bitstream for use by the decoded reference picture marking process as described above, wherein the encoder includes the view identifier in the resultant bitstream to indicate to which of the at least two views a particular picture to be marked by the decoded reference picture marking process belongs.

Also, another advantage/feature is the apparatus having the encoder that decouples the at least one of the coding order information and output order information for the at least one picture using the view identifier as described above, wherein the encoder uses at least one existing syntax element (no_output_of_prior_pics_flag, long_term_reference_flag, adaptive_ref_pic_marking_mode_flag, memory_ management_control_operation, difference_of_pic_nums_minus1, long_term_pic_num, long_term_frame_idx, max_long_term_frame_idx_plus1) with semantics of the at least one existing syntax element redefined for use in a redefined decoded reference picture marking process corresponding to the International Organization for Standardization/International Electrotechnical Commission Moving Picture Experts Group-4 Part 10 Advanced Video Coding standard/International Telecommunication Union, Telecommunication Sector H.264 recommendation to support a use of the view identifier in the redefined decoded reference picture marking process.

Additionally, another advantage/feature is the apparatus having the encoder that uses the view identifier and at least one existing syntax element as described above, wherein in the redefined decoded reference picture marking process, only pictures with a same view identifier as a currently decoded picture are marked.

Moreover, another advantage/feature is the apparatus having the encoder that uses the view identifier and at least one existing syntax element as described above, wherein at least one of a sliding window decoded reference picture marking process and an adaptive memory control decoded reference picture marking process are applied.

Further, another advantage/feature is the apparatus having the encoder that uses the view identifier and at least one existing syntax element as described above, wherein in the redefined decoded reference picture marking process, pictures which have a different view identifier than that of the at least one picture are marked using a previously unused syntax element (difference_of_view_ids_minus1).

Also, another advantage/feature is the apparatus having the encoder that decouples the at least one of the coding order information and output order information for the at least one picture using the view identifier as described above, wherein the encoder includes the view identifier in the resultant bitstream for default reference picture list construction.

Additionally, another advantage/feature is the apparatus having the encoder that includes the view identifier in the resultant bitstream for the default reference picture list construction as described above, wherein inter-view reference pictures are prohibited from being added to a reference list for a default reference picture list creation process corresponding to the reference picture list construction, according to at least one existing syntax element (frame_num and pic_order_cnt_lsb), existing semantics, and an existing decoding process for the reference picture list construction with an additional support from a view identifier, the existing syntax, the existing semantics, and the existing decoding process corresponding to the International Organization for Standardization/International Electrotechnical Commission Moving Picture Experts Group-4 Part 10 Advanced Video Coding standard/International Telecommunication Union, Telecommunication Sector H.264 recommendation.

Additionally, another advantage/feature is the apparatus having the encoder that includes the view identifier in the resultant bitstream for the default reference picture list construction as described above, wherein only inter-view reference pictures are added to a reference list for a default reference picture list creation process corresponding to the reference picture list construction, according to at least one existing syntax element (frame_num and pic_order_cnt_lsb) for the default reference picture list construction with an additional support from a view identifier.

Moreover, another advantage/feature is the apparatus having the encoder wherein only inter-view reference pictures are added to the reference list for the default reference picture list creation process as described above, wherein the inter-view reference pictures are added after temporal references.

Further, another advantage/feature is the apparatus having the encoder that decouples the at least one of the coding order information and output order information for the at least one picture using the view identifier as described above, wherein the encoder uses at least one existing syntax element (ref_pic_list_reordering_flag_l0, reordering_of_pic_nums_idc, abs_diff_pic_num_minus1, long_term_pic_num, ref_pic_list_reordering_flag_l1, reordering_of_pic_nums_idc, abs_diff_pic_num_minus1, long_term_pic_num) redefined for use in a redefined reference picture list reordering process corresponding to the International Organization for Standardization/International Electrotechnical Commission Moving Picture Experts Group-4 Part 10 Advanced Video Coding standard/International Telecommunication Union, Telecommunication Sector H.264 recommendation to support a use of the view identifier in the redefined reference picture list reordering process.

Also, another advantage/feature is the apparatus having the encoder that uses the view identifier and the at least one existing syntax element as described above, wherein in the redefined reference picture list reordering process, only pictures with a same view identifier as a currently decoded picture are reordered.

Additionally, another advantage/feature is the apparatus having the encoder wherein only pictures with the same view identifier as the currently decoded picture are reordered as described above, wherein the view identifier indicates to which of the at least two views corresponds a particular picture to be moved to a current index in a corresponding reference picture list.

Moreover, another advantage/feature is the apparatus having the encoder wherein only pictures with the same view identifier as the currently decoded picture are reordered as described above, wherein the view identifier is only required when the view identifier of a reference picture to be ordered is different from that of the at least one picture.

Further, another advantage/feature is the apparatus having the encoder that decouples the at least one of the coding order information and output order information for the at least one picture using the view identifier as described above, wherein the encoder uses an existing syntax element (pic_order_cnt_lsb) redefined for temporal DIRECT mode, the existing syntax corresponding to the International Organization for Standardization/International Electrotechnical Commission Moving Picture Experts Group-4 Part 10 Advanced Video Coding standard/International Telecommunication Union, Telecommunication Sector H.264 recommendation to support a use of the view identifier in the temporal DIRECT mode.

Further, another advantage/feature is the apparatus having the encoder that uses the view identifier and the existing syntax element as described above, wherein the temporal DIRECT mode is derived based on at least one of a Picture Order Count value and a view identifier.

Also, another advantage/feature is the apparatus having the encoder that decouples the at least one of the coding order information and output order information for the at least one picture using the view identifier as described above, wherein the encoder uses an existing syntax element (pic_order_cnt_lsb), existing semantics, and an existing decoding process for temporal DIRECT mode, the existing syntax, the existing semantics, and the existing decoding process corresponding to the International Organization for Standardization/International Electrotechnical Commission Moving Picture Experts Group-4 Part 10 Advanced Video Coding standard/International Telecommunication Union, Telecommunication Sector H.264 recommendation.

Additionally, another advantage/feature is the apparatus having the encoder that decouples the at least one of the coding order information and output order information for the at least one picture using the view identifier as described above, wherein the encoder uses an existing syntax element (pic_order_cnt_lsb) redefined for implicit weighted prediction, the existing syntax corresponding to the International Organization for Standardization/International Electrotechnical Commission Moving Picture Experts Group-4 Part 10 Advanced Video Coding standard/International Telecommunication Union, Telecommunication Sector H.264 recommendation to support a use of the view identifier in the implicit weighted prediction.

Moreover, another advantage/feature is the apparatus having the encoder that uses the view identifier and the existing syntax element as described above, wherein the implicit weighted prediction is derived based on at least one of a Picture Order Count value and a view identifier.

Further, another advantage/feature is the apparatus having the encoder that decouples the at least one of the coding order information and output order information for the at least one picture using the view identifier as described above, wherein the encoder uses an existing syntax element (pic_order_cnt_lsb), existing semantics, and an existing decoding process for implicit weighted prediction, the existing syntax, the existing semantics, and the existing decoding process corresponding to the International Organization for Standardization/International Electrotechnical Commission Moving Picture Experts Group-4 Part 10 Advanced Video Coding standard/International Telecommunication Union, Telecommunication Sector H.264 recommendation.

Also, another advantage/feature is the apparatus having the encoder as described above, wherein the encoder uses a particular one of the at least two views corresponding to a particular picture to specify an inter-view dependency in a parallel encoding of different ones of the at least two views.

Yet another advantage/feature is an apparatus that includes an encoder for encoding at least one of at least two views corresponding to multi-view video content. The encoder encodes the at least one of the at least two views using redefined variables in a default reference picture list construction process and reference picture list reordering corresponding to the International Organization for Standardization/International Electrotechnical Commission Moving Picture Experts Group-4 Part 10 Advanced Video Coding standard/International Telecommunication Union, Telecommunication Sector H.264 recommendation.

Moreover, another advantage/feature is an apparatus that includes the encoder as described above, wherein at least one of a number of views and view identifier information is used to redefine the variables.

Further, another advantage/feature is an apparatus that includes the encoder as described above, wherein at least one of a Group Of Pictures length and view identifier information is used to redefine the variables.

Yet another advantage/feature is an apparatus that includes an encoder for encoding at least one of at least two views corresponding to multi-view video content. The encoder encodes the at least one of the at least two views using redefined variables in a decoded reference picture marking process of the International Organization for Standardization/International Electrotechnical Commission Moving Picture Experts Group-4 Part 10 Advanced Video Coding standard/International Telecommunication Union, Telecommunication Sector H.264 recommendation.

Moreover, another advantage/feature is an apparatus that includes the encoder as described above, wherein at least one of a number of views and view identifier information is used to redefine the variables.

Further, another advantage/feature is an apparatus that includes the encoder as described above, wherein at least one of a Group Of Pictures length and view identifier information is used to redefine the variables.

It is to be appreciated that the selection of particular syntax names, particularly previously unused syntax names as described with respect to various inventive aspects of the present principles, is for purposes of illustration and clarity and, thus, given the teachings of the present principles provided herein, other names and/or characters and so forth may also be used in place of and/or in addition to the syntax names provided herein, while maintaining the spirit of the present principles.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus for multi-view video encoding, comprising:
    an encoder for encoding at least one picture corresponding to at least one of at least two views of multi-view video content to form a resultant bitstream,
    wherein in the resultant bitstream at least one of coding order information and output order information for the at least one picture is determined and is decoupled from the at least one view to which the at least one picture corresponds,
    wherein said encoder determines the at least one of the coding order information and output order information for the at least one picture based on a view identifier and the view identifier is present at a level higher than a macroblock level in the resultant bitstream;
    wherein said encoding step encodes the at least one of the at least two views using redefined variables in a default reference picture list construction process and reference picture list reordering process,
    wherein a Group Of Pictures length is used to redefine the variables;
    wherein coding order information is redefined as frame_num*N+view_id whereas output order information is redefined as PicOrderCnt(picX)*N+view_id, where frame_num is representative of coding order information, PicOrderCnt is representative of output order information, N is a number of views and view_id is the view identifier; and,
    wherein said encoder includes the view identifier in the resultant bitstream for use by a decoded reference picture marking process.

2. A method for multi-view video encoding, comprising:
    encoding at least one picture corresponding to at least one of at least two views of multi-view video content to form a resultant bitstream,
    wherein in the resultant bitstream at least one of coding order information and output order information for the at least one picture is determined and is decoupled from the at least one view to which the at least one picture corresponds
    wherein said encoding step determines the at least one of the coding order information and output order information for the at least one picture based on a view identifier and the view identifier is present at a level higher than a macroblock level in the resultant bitstream;
    wherein said encoding step encodes the at least one of the at least two views using redefined variables in a default reference picture list construction process and reference picture list reordering process,
    wherein a Group Of Pictures length is used to redefine the variables;
    wherein coding order information is redefined as frame_num*N+view_id whereas output order information is redefined as PicOrderCnt(picX)*N+view_id, where frame_num is representative of coding order information, PicOrderCnt is representative of output order information, N is a number of views and view_id is the view identifier; and,
    wherein said encoding step includes the view identifier in the resultant bitstream for use by a decoded reference picture marking process.

3. A method, comprising:
    decoding at least one of at least two views corresponding to multi-view video content, wherein said decoding step decodes the at least one of the at least two views using redefined variables in a decoded reference picture marking process of the International Organization for Standardization/International Electrotechnical Commission Moving Picture Experts Group-4 Part 10 Advanced Video Coding standard/International Telecommunication Union, Telecommunication Sector H.264 recommendation, wherein a Group Of Pictures length is used to redefine the variables, wherein coding order information is redefined as frame_num*N+view_id whereas output order information is redefined as PicOrderCnt(picX)*N+view_id, where frame_num is representative of coding order information, PicOrderCnt is representative of output order information, N is a number of views and view_id is the view identifier.

4. The method of claim 3, wherein at least one of a number of views and view identifier information is further used to redefine the variables.

5. The method of claim 3, wherein view identifier information is further used to redefine the variables.

* * * * *